(12) United States Patent
Dube et al.

(10) Patent No.: US 8,507,605 B2
(45) Date of Patent: Aug. 13, 2013

(54) LATEX COMPOSITIONS AND USES THEREOF

(75) Inventors: Marc Arnold Dube, Ottawa (CA); Lili Qie, Woodbury, MN (US)

(73) Assignee: University of Ottawa, Ottawa, Ontario (CA)

( * ) Notice: Subject to any disclaimer, the term of this patent is extended or adjusted under 35 U.S.C. 154(b) by 331 days.

(21) Appl. No.: 13/033,547

(22) Filed: Feb. 23, 2011

(65) Prior Publication Data

US 2012/0214916 A1 Aug. 23, 2012

(51) Int. Cl.
*C08L 33/08* (2006.01)
*C08L 33/10* (2006.01)
*B29D 7/01* (2006.01)
*C08F 2/22* (2006.01)

(52) U.S. Cl.
USPC ........... 524/833; 524/556; 524/558; 264/216; 428/500

(58) Field of Classification Search
USPC .......................................... 524/556, 558, 833
See application file for complete search history.

(56) References Cited

U.S. PATENT DOCUMENTS

| | | | |
|---|---|---|---|
| 3,706,697 A | 12/1972 | Backderf | |
| 4,077,926 A | 3/1978 | Sanderson et al. | |
| 4,322,516 A | 3/1982 | Wiest et al. | |
| 4,474,923 A | 10/1984 | Keskey et al. | |
| 4,923,919 A | 5/1990 | Frazee | |
| 5,278,227 A | 1/1994 | Bernard | |
| 5,362,816 A | 11/1994 | Snyder et al. | |
| 5,416,134 A | 5/1995 | Skoglund | |
| 6,281,298 B1 | 8/2001 | Papsin, Jr. | |
| 6,541,566 B1 | 4/2003 | Farwaha et al. | |
| 6,608,134 B1 * | 8/2003 | Tobing et al. | 524/501 |
| 6,972,311 B2 | 12/2005 | Chevillard et al. | |
| 7,521,487 B2 | 4/2009 | Hansen et al. | |
| 7,645,827 B2 | 1/2010 | Lewandowski et al. | |
| 7,652,095 B2 | 1/2010 | Filiatrault et al. | |
| 7,652,103 B2 | 1/2010 | Kavanagh et al. | |
| 7,714,076 B2 | 5/2010 | Krepski et al. | |

(Continued)

FOREIGN PATENT DOCUMENTS

| | | |
|---|---|---|
| EP | 1 218 446 | 7/2002 |
| JP | 2003-013027 | 1/2003 |

(Continued)

OTHER PUBLICATIONS

Agirre, A. et al., "Miniemulsion Polymerization of 2-Ethylhexyl Acrylate. Polymer Architecture Control and Adhesion Properties," Macromolecules, 2010, vol. 43, No. 21, pp. 8924-8932.

(Continued)

*Primary Examiner* — Vu A Nguyen
(74) *Attorney, Agent, or Firm* — Foley & Lardner LLP

(57) ABSTRACT

The present technology provides a latex comprising: a mixture of microgels and sol polymers of an acrylic copolymer, wherein the $M_c$ of the acrylic copolymer is greater than or equal to the $M_e$ thereof; the $M_w$ of the sol polymers is greater than or equal to twice the $M_e$ of the acrylic copolymer; the amount of sol polymer having a $M_w$ less than twice the $M_e$ of the acrylic copolymer is about 20 wt % or less than 20 wt %. Such lattices may be used to form films for use as adhesives such as pressure sensitive adhesives. Also provided are methods for manufacturing the films and adhesives.

18 Claims, 17 Drawing Sheets

(56) References Cited

U.S. PATENT DOCUMENTS

| | | |
|---|---|---|
| 7,763,337 B2 | 7/2010 | Paiva et al. |
| 2008/0023132 A1 | 1/2008 | Sano et al. |
| 2010/0124627 A1 | 5/2010 | Nonaka et al. |

FOREIGN PATENT DOCUMENTS

| | | |
|---|---|---|
| WO | WO-0068316 A1 | 11/2000 |
| WO | WO-2007/061242 | 5/2007 |
| WO | WO-2009/066883 | 5/2009 |

OTHER PUBLICATIONS

Benedek, I., "Chapter 2—Rheology of Pressure-Sensitive Adhesives," Pressure-Sensitive Adhesive and Applications, CRC Press, Marcel Dekker Inc., Feb. 3, 2004, pp. 5-88.

Benedek, I., "Chapter 3—Physical Basis for the Viscoelastic Behavior of Pressure-Sensitive Adhesives," Pressure-Sensitive Adhesive and Applications, CRC Press, Marcel Dekker Inc., Feb. 3, 2004, pp. 89-145.

Eckersley, S.T. et al., "The film formation of acrylic latexes: A comprehensive model of film coalescence," Journal of Applied Polymer Science, 1994, vol. 53, pp. 1139-1147.

Elizalde, O. et al., "Control of adhesive properties of n-butyl acrylate/styrene latexes," Polym. React. Eng., 2002, vol. 10, No. 4, pp. 265-283.

Elizalde, O. et al., "Knowledge-based control of emulsion polymerization: Tailoring adhesive properties," J. of Coatings Technology and Research, Jan. 2004, vol. 1, No. 1, pp. 45-51.

Flanigan, C.M. et al., "Structural Development and Adhesion of Acrylic ABA Triblock Copolymer Gels," Macromolecules, 1999, vol. 32, No. 21, pp. 7251-7262.

Foster, A.B. et al., "Control of adhesive properties through structured particle design of water-borne pressure-sensitive adhesives," Polymer, 2009, vol. 50, pp. 1654-1670.

Gower, M.D. et al., "Acrylic acid level and adhesive performance and peel master-curves of acrylic pressure-sensitive adhesives," J. Polym. Sci., Part B: Polym. Phys., 2006, vol. 44, pp. 1237-1252.

Gower, M.D. et al., "Comparison of styrene with methyl methacrylate copolymers on the adhesive performance and peeling master curves of acrylate pressure sensitive adhesives," Macromol. Chem. Phys., 2005, vol. 206, No. 10, pp. 1015-1027.

Gower, M.D. et al., "The effect of chain transfer agent level on adhesive performance and peel master-curves for acrylic pressure sensitive adhesives," Macromolecular Chemistry and Physics, 2004, vol. 205, pp. 2139-2150.

Gower, M.D. et al., "The effect of varied monomer composition on adhesive performance and peeling master curves for acrylic pressure-sensitive adhesives," J. Appl. Polym. Sci., 2004, vol. 93, pp. 2909-2917.

Jovanovic, R. et al., "Butyl Acrylate/Methyl Methacrylate Latexes: Adhesive Properties," Macromol. Symp., 2004, vol. 206, pp. 43-56.

Jovanovic, R. et al., "Butyl Acrylate/Vinyl Acetate Emulsion-Based Pressure-Sensitive Adhesives: Empirical Modelling of Final Properties," Can. J. Chem. Eng., Jun. 2007, vol. 85, pp. 341-349.

Jovanovic, R. et al., "Empirical Modeling of Butyl Acrylate/Vinyl Acetate/Acrylic Acid Emulsion-Based Pressure-Sensitive Adhesives," Macromol. Mat. Eng., 2004, vol. 289, pp. 467-474.

Jovanovic, R. et al., "Emulsion-Based Pressure-Sensitive Adhesives: A Review," Journal of Macromol. Sci. Part C—Polymer Review, 2004, vol. C44, No. 1, pp. 1-51.

Jovanovic, R. et al., "Screening Experiments for Butyl Acrylate/Vinyl Acetate Pressure-Sensitive Adhesives," Ind. Eng. Chem. Res., 2005, vol. 44, No. 17, pp. 6668-6675.

Kajtna, J. et al., "The effect of polymer molecular weight and crosslinking reactions on the adhesion properties of microsphere water-based acrylic pressure-sensitive adhesives," Int. J. Adhes. Adhes., 2009, vol. 29, No. 2, pp. 186-194.

Li, L. et al., "Surface energy and adhesion studies on acrylic pressure sensitive adhesives," J. Adhes., 2001, vol. 76, No. 4, pp. 307-334.

Qie, L. et al., "Manipulating Latex Polymer Microstructure Using Chain Transfer Agent and Cross-Linker to Modify PSA Performance and Viscoelasticity," Macromol. React. Eng., 2011, vol. 5, pp. 117-128.

Qie, L. et al., "Manipulation of chain transfer agent and cross-linker concentration to modify latex micro-structure for pressure-sensitive adhesives," Eur. Polym. J., 2010, vol. 46, pp. 1225-1236.

Qie, L. et al., "The Influence of Butyl Acrylate/Methyl Methacrylate/2-Hydroxyl Ethyl Methacrylate/Acrylic Acid Latex Properties on Pressure Sensitive Adhesive Performance," Int. J. Adhes. Adhes., 2010, vol. 30, pp. 654-664.

Qie, L. et al., "Pressure Sensitive Adhesive Performance and Latex Properties," (Power Point), The Influence of Latex Properties on Pressure—Sensitive Adhesive Performance, 58th Can. Chem. Eng. Conf., Ottawa, ON, Oct. 19-22, 2008, 20 pages.

Qie, L. et al., Poster: PSA Performance Modification using HEMA and AA in BA/MMA Latexes, Polym. React. Eng. VII, Niagara Falls, ON, May 3-8, 2009, 1 page.

Satas, D., "Chapter 1—Pressure Sensitive Adhesives and Adhesive Products in the United States," Handbook of Pressure Sensitive Adhesive Technology, Satas & Associates, 1999, pp. 1-23.

Tobing, S.D. et al., "Molecular parameters and their relation to the adhesive performance of acrylic pressure-sensitive adhesives," J. Appl. Polym. Sci., 2001, vol. 79, pp. 2230-2244.

Tobing, S.D. et al., "Molecular parameters and their relation to the adhesive performance of emulsion acrylic pressure-sensitive adhesives. II. Effect of crosslinking," J. Appl. Polym. Sci., 2001, vol. 79, pp. 2558-2564.

Tobing, S.D., et al., "Effect of network morphology on adhesive performance in emulsion blends of acrylic pressure sensitive adhesives," J. Appl. Polym. Sci., 2001, vol. 81, pp. 2109-2117.

Yang, H.W.H. et al., "The role of viscoelastic properties in the design of pressure-sensitive adhesives," Trends Polym. Sci. (TRIP), Nov. 1997, vol. 5, No. 11, pp. 380-384.

Zosel, A. et al., "Influence of cross-linking on structure, mechanical properties, and strength of latex films," Macromol., 1993, vol. 26, No. 9, 2222-2227.

Zosel, A., "Adhesion and tack of polymers: Influence of mechanical properties and surface tensions," Colloid Polym. Sci., 1985, vol. 263, No. 7, pp. 541-553.

Zosel, A., "The effect of fibrilation on the tack of pressure sensitive adhesives," Int. J. Adhes. Adhes., 1998, vol. 18, pp. 265-271.

Agirre, A. et al., "Waterborne, Semicrystalline, Pressure-Sensitive Adhesives with Temperature-Responsiveness and Optimum Properties," ACS Appl Mater Interfaces, 2010, vol. 2, pp. 443-451.

Deplace, F. et al., "Fine Tuning the Adhesive Properties of a Soft Nanostructured Adhesive with Rheological Measurements," J. Adhesion, 2009, vol. 85, pp. 18-54.

Lakrout, H. et al., "Direct Observation of Cavitation and Fibrillation in a Probe Tack Experiment on Model Acrylic Pressure-Sensitive-Adhesives," J. Adhesion, 1999, vol. 69, pp. 307-359.

Martin, L.L., "Adhesives Essentials: Formulating with Resin Dispersions," Adhesives and Sealants Industry, Apr. 1, 2006, 12 pages.

Qie, L. et al., Influence of Polymer Microstructure of Latex-based Pressure Sensitive Adhesives on the Performance of Post-treated PSAs, Chapter 6, University of Ottawa, 2011, pp. 176-216.

Qie, L., "Performance Improvement of Latex-based PSAs Using Polymer Microstructure Control," Thesis, 2011, printed on Aug. 15, 2011, retrieved from the internet (http://www.ruor.uottawa.ca/en/bitstream/handle/10393/19727/Qie_Lili_2011_thesis.pdf?sequence=1), 271 pages.

Mun, F.T., "Studies of triblock copolymer-tackifying resin interactions by viscoelasticity and adhesive performance," Journal of Adhesion Science and Technology, 1989, vol. 3, No. 7, pp. 551-570.

International Search Report and Written Opinion for PCT/US2011/025968 mailed Jun. 2, 2011.

* cited by examiner

LATEX COMPOSITIONS AND USES THEREOF

BACKGROUND

The following description is provided to assist the understanding of the reader. None of the information provided or references cited is admitted to be prior art to the present invention.

Pressure sensitive adhesives (PSAs) are viscoelastic materials that can adhere to a variety of substrates. PSA performance is generally evaluated by tack peel strength, and shear strength. Tack is a measure of how strongly a PSA can bond to a surface under a short contact time, while peel strength is a measure of how strongly a can bond to a surface by peeling it off the surface. Shear strength is a measure of the ability of a PSA to resist deformation under a shear force. Generally, an increase in shear strength for a PSA causes a corresponding decrease in tack and peel strength. This is due to the fact that in order to increase shear strength, the cohesive strength of the PSA must be increased. However, increasing the cohesive strength tends to reduce the ability of a PSA to deform and flow. Thus, the ability of a PSA to wet the substrate is attenuated and corresponding decreases in tack and peel strength are observed.

PSAs may be classified into three categories, according to their method of preparation. Solvent-based PSA films are made by casting a solution of a polymer, typically in an organic solvent. Hot melt PSA films are prepared by casting melt polymers. Latex-based PSA films are prepared by casting an aqueous latex dispersion prepared by emulsion or suspension polymerization. It is often observed that solvent-based PSAs exhibit better performance than latex-based PSAs, displaying larger shear strengths at similar tack and peel strength levels. The increased shear strengths associated with solvent-based PSAs has been attributed to their continuous gel networks. Thus, despite the environmental implications associated with solvent-based PSAs which often contain volatile organic compounds, solvent-based PSAs find continued use in high performance applications requiring large shear strengths.

SUMMARY

The present technology provides latex compositions for use as adhesives with improved performance properties with respect to tack strength, peel strength, and shear strength. Such gains in cohesive and adhesive properties for the present adhesives are achieved through manipulation of the microstructures of the latex, e.g., manipulation of the amount and $M_w$ of sol polymers and the $M_c$. Films formed from the present lattices may be used as adhesives such as pressure sensitive adhesives. Methods of manufacturing the lattices, films and adhesives are also provided.

In accordance with one aspect, the present technology provides a latex that includes a mixture of microgels and sol polymers of an acrylic copolymer. The $M_c$ of the acrylic copolymer is greater than or equal to the $M_e$ thereof. The $M_w$ of the sol polymers is greater than or equal to twice the $M_e$ of the acrylic copolymer. The amount of sol polymer having a $M_w$ less than twice the $M_e$ of the acrylic copolymer is about 20 wt % or less than 20 wt %.

In another aspect, the present technology of manufacturing a latex, including polymerizing a monomer emulsion that includes water, a low $T_g$ acrylic monomer, a high $T_g$ monomer, a hydroxyl-containing acrylic monomer, to provide a latex comprising a mixture of microgels and sol polymers of an acrylic copolymer. The $M_c$ of the acrylic copolymer is greater than or equal to the $M_e$ thereof. The $M_w$ of the sol polymers is greater than or equal to twice the $M_e$ of the acrylic copolymer. The amount of sol polymer having a $M_w$ less than twice the $M_e$ of the acrylic copolymer is about 20 wt % or less than 20 wt %.

In yet another aspect, a film may be formed from any latex disclosed herein by casting the latex into a film and drying the film.

The foregoing summary is illustrative only and is not intended to be in any way limiting. In addition to the illustrative aspects, embodiments and features described above, further aspects, embodiments and features will become apparent by reference to the following drawings and the detailed description.

DETAILED DESCRIPTION

Figure 1:
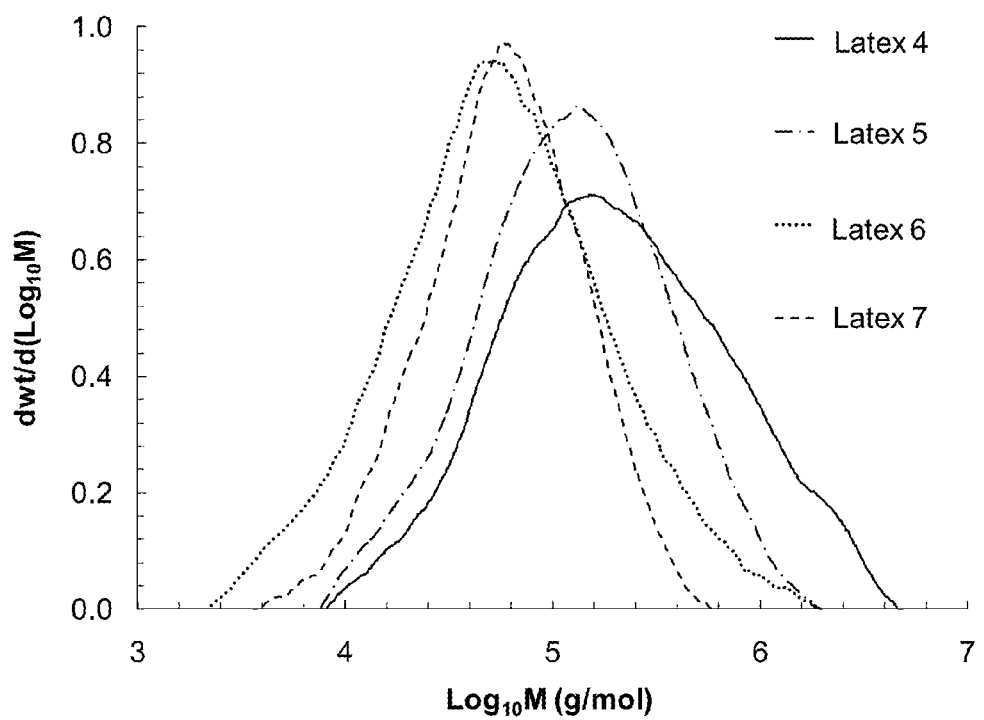
FIG. 1 shows the molecular weight distribution of the sol polymers of lattices 4 through 7 of Example 1.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The present technology is described herein using several definitions, as set forth throughout the specification.

As used herein, unless otherwise stated, the singular forms "a," "an," and "the" include plural reference. Thus, for example, a reference to "a cell" includes a plurality of cells, and a reference to "a molecule" is a reference to one or more molecules.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The term "acrylic monomer" means a monomer of a substituted or unsubstituted: acrylic acid, methacrylic acid, acrylate, methacrylate, or mixture thereof. Acrylates include $C_1$ to $C_{20}$ alkyl, alkenyl, aryl acrylates such as methyl acrylate, ethyl acrylate, phenyl acrylate, butyl acrylate, 2-ethylhexyl acrylate, isobornyl acrylate and functional derivatives of these acrylates such as 2-hydroxyethyl acrylate, 2-hydroxypropyl acrylate, 2-chloroethyl acrylate, allyl acrylate, and the like. Methacrylates include $C_1$ to $C_{20}$ alkyl, alkenyl, aryl or cyclic methacrylates such as methyl methacrylate, ethyl methacrylate, butyl methacrylate, 2-ethylhexyl methacrylate, phenyl methacrylate, isobornyl methacrylate, and functional derivatives of these methacrylates such as 2-hydroxyethyl methacrylate, 2-hydroxypropyl acrylate, 2-chloroethyl methacrylate, allyl methacrylate, and the like.

The term "emulsion" means a stable mixture of two or more immiscible liquids held in suspension by one or more surfactants.

The term "gel" (or "gel polymer") refers to the fraction of a polymer sample which is insoluble in tetrahydrofuran (THF) as determined according the method described in the Examples. The term "gel content" means the weight percentage of the gel (or gel polymer) in the polymer sample.

The term "high $T_g$ monomer" means an acrylic monomer or a monomer copolymerizable with an acrylic monomer, the homopolymer of which has a glass transition temperature greater than 30° C. Non-limiting examples of high $T_g$ monomers include acrylic acid, methyl methacrylate, methyl acrylate, styrene, vinyl acetate, and the like.

The term "hydroxyl-containing acrylic monomer" means an acrylic monomer containing at least one hydroxyl group which is not a carboxylic acid group. Examples of hydroxyl-containing acrylic monomers include 2-hydroxyethyl acrylate, 2-hydroxypropyl acrylate, 4-hydroxybutyl acrylate, 2-hydroxyethyl methacrylate, 2-hydroxypropyl methacrylate, 6-hydroxyhexyl methacrylate, and the like.

The term "latex" means an aqueous suspension or emulsion of a water-insoluble polymer.

The term "low $T_g$ acrylic monomer" means an acrylic monomer, the homopolymer of which has a glass transition temperature less than or equal to −20° C. Non-limiting examples of low $T_g$ acrylic monomers include butyl acrylate, 2-ethylhexyl acrylate, octyl acrylate, and the like.

The term "$M_c$" means molecular weight between adjacent cross-link points in a polymer.

The term "$M_e$" means molecular weight between adjacent entanglements in a polymer composition.

The term "$M_w$" means the weight average molecular weight of a polymer.

The term "microgel" means a polymer gel network in a latex particle with an average diameter from about 50 nm to about 500 nm. A microgel is insoluble in an organic solvent such as THF and thus may not form a gel as that term is defined herein.

The term "sol" (or "sol polymer") refers to the fraction of polymer in a polymer sample which is soluble in THF as determined according to the method described in the Examples.

The term "alkyl," by itself or as part of another substituent, means, unless otherwise stated, a fully saturated, straight, branched chain, or cyclic hydrocarbon radical, or combination thereof, and can include di- and multi-valent radicals, having the number of carbon atoms designated (e.g., $C_1$-$C_{20}$ means from one to twenty carbon atoms, inclusive). A cyclic alkyl group may also be referred to as a "cycloalkyl." In some embodiments the alkyl group has 1, 2, 3, 4, 5, 6, 7, 8, 9, 10, 11, 12, 13, 14, 15, or 16 carbons or falls in a range between and including any two of these values. In some embodiments the alkyl group is a lower alkyl group having from 1 to 6 carbon atoms. Examples of alkyl groups include, without limitation, methyl, ethyl, n-propyl, isopropyl, n-butyl, t-butyl, isobutyl, sec-butyl, cyclohexyl, (cyclohexyl)ethyl, cyclopropylmethyl, and homologs and isomers thereof, for example, n-pentyl, n-hexyl, n-heptyl, n-octyl, and the like.

The term "alkenyl" means an alkyl group as defined above containing one or more double bonds. In some embodiments the alkenyl group has 1 or 2 double bonds. Examples of alkenyl groups include but are not limited to vinyl, 2-propenyl (i.e., allyl), crotyl, 2-isopentenyl, 2-(butadienyl), 2,4-pentadienyl, 3-(1,4-pentadienyl), etc., and the higher homologs and isomers.

The term "alkynyl" means an alkyl or alkenyl group as defined above containing one or more triple bonds. Examples of alkynyl groups include ethynyl, 1- and 3-propynyl, 3-butynyl, and the like, including the higher homologs and isomers.

The term "aryl" is used herein to refer to an aromatic substituent, which may be a single aromatic ring or multiple (typically 2 or 3) aromatic rings which are fused together, linked covalently, or linked to a common group such as a diazo, methylene or ethylene moiety. The common linking group may also be a carbonyl as in benzophenone. The aromatic ring(s) may include, for example phenyl, naphthyl, biphenyl, diphenylmethyl and benzophenone, among others. The term "aryl" encompasses "arylalkyl" and "substituted aryl." For phenyl groups, the aryl ring may be mono-, di-, tri-, tetra-, or penta-substituted. Larger rings may be unsubstituted or bear one or more substituents.

"Substituted" refers to a chemical group as described herein that further includes one or more substituents, such as lower alkyl (including substituted lower alkyl such as haloalkyl, hydroxyalkyl, aminoalkyl), aryl (including substituted aryl), acyl, halogen, hydroxy, amino, alkoxy, alkylamino, acylamino, thioamido, acyloxy, aryloxy, aryloxyalkyl, carboxy, thiol, sulfide, sulfonyl, oxo, both saturated and unsaturated cyclic hydrocarbons (e.g., cycloalkyl, cycloalkenyl), and the like. These groups may be attached to any carbon or substituent of the alkyl, alkenyl, alkynyl, aryl, alkylene, alkenylene, alkynylene, or arylene groups. Additionally, the substituents may be pendent from, or integral to, the carbon chain itself.

The term "acyl" is used to describe a carbonyl-containing substituent, —C(O)R, where R is —H or substituted or unsubstituted alkyl, alkenyl, alkynyl, or aryl as defined herein.

The term "alkoxy" is used herein to refer to the —OR group, where R is monovalent or divalent alkyl, alkenyl, or alkynyl, or a substituted analog thereof. Suitable alkoxy radicals include, for example, methoxy, ethoxy, t-butoxy, etc. The term "alkoxyalkyl" refers to ether substituents, monovalent or divalent, e.g., —CH$_2$—O—CH$_3$ and —CH$_2$—O—CH$_2$—.

The term "aryloxy" is used herein to refer to —O-aryl groups where the aryl is substituted or unsubstituted as defined above and may be mono or divalent. Examples of aryloxy groups include but are not limited to phenoxy, naphthyloxy, tolyloxy, and 2-chlorophenyloxy.

The term "amino" is used to designate NRR', wherein R and R' are independently H, alkyl, alkenyl, alkynyl, aryl or substituted analogs thereof. Thus, "amino" includes primary, secondary and tertiary amines, and "acylamino" describing the group RC(O)NR'.

The term "carbonyl" is used to describe a C=O substituent. "Oxo" refers to the double bonded oxygen in a carbonyl.

The term "carboxy" refers to an ester substituent or carboxylic acid, i.e., RC(O)O—, —C(O)OR, or —C(O)—OH. The R group can be a substituted or unsubstituted alkyl, alkenyl, alkynyl, or aryl group.

The term "halogen" or "halo" is used herein to refer to fluorine, bromine, chlorine and iodine atoms.

The term "hydroxy" is used herein to refer to the group —OH.

The term "sulfonate" is used herein to refer to —SO$_3$H, RSO$_2$O— or —SO$_2$OR groups. The R group can be a substituted or unsubstituted alkyl, alkenyl, alkynyl, or aryl group.

The present technology provides latex compositions that may be used as adhesives such as pressure sensitive adhesives. Thus the latex compositions may be formed into films with high tack, peel strength and shear strength. The present technology also provides methods of making such lattices and films.

Thus, according to one aspect, the present technology provides a latex which includes a mixture of microgels and sol polymers of an acrylic copolymer, wherein the $M_c$ of the acrylic copolymer is greater than or equal to the $M_e$ thereof; the $M_w$, of the sol polymers is greater than or equal to twice the $M_e$ of the acrylic copolymer; and the amount of sol polymer having a $M_w$ less than twice the $M_e$ of the acrylic copolymer is about 20 wt % or less than 20 wt %. Specific examples of the amount of sol polymer having a $M_w$ less than twice the $M_e$ of the acrylic copolymer include about 18 wt %, about 16 wt %, about 14 wt %, about 12 wt %, about 10 wt %, about 9 wt %, about 8 wt %, about 7 wt %, about 6 wt %, about 5 wt %, about 4 wt %, about 3 wt %, about 2 wt %, about 1 wt %, and ranges between and including any two of these values. In some embodiments, the acrylic copolymer comprises copolymerized monomers of a low $T_g$ acrylic monomer, a high $T_g$ monomer, and a hydroxyl-containing acrylic monomer.

In some embodiments of the latex of the present technology, the acrylic copolymer includes at least about 90 wt % of the copolymerized low $T_g$ acrylic monomer. For example, the acrylic copolymer may include about 90 wt % to about 98 wt % of copolymerized low $T_g$ acrylic monomer. Further examples of the amount of low Tg acrylic monomer include about 90 wt %, about 91 wt %, about 92 wt %, about 93 wt %, about 94 wt %, about 95 wt %, about 96 wt %, about 97 wt %, about 98 wt %, or a range between and including any two of these values. In some embodiments, the low $T_g$ acrylic monomer may selected from the group consisting of butyl acrylate, 2-ethylhexyl acrylate, methyl acrylate, octyl acrylate, sec-butyl acrylate, dodecyl methacrylate, 2-ethoxyethyl acrylate, isobutyl acrylate, 2-methoxyethyl acrylate, octyl methacrylate and any two or more thereof.

In some embodiments of the latex of the present technology, the acrylic copolymer further comprises a copolymerized acrylic monomer with a glass transition temperature less than 30° C. than and greater than −20° C. In some embodiments, the amount of such acrylic monomers is at least about 1 wt %. For example, the acrylic copolymer may include about 1 wt % to about 9 wt % of such copolymerized acrylic monomer. Further examples of the amount of such copolymerized monomer include about 1 wt %, about 2 wt %, about 3 wt %, about 4 wt %, about 5 wt %, about 6 wt %, about 7 wt %, about 8 wt %, about 9 wt %, or a range between and including any two of these values.

In some embodiments of the latex of the present technology, the acrylic copolymer comprises at least about 1 wt % of high $T_g$ monomer. For example, the acrylic copolymer may include about 1 wt % to about 9 wt % of copolymerized high $T_g$ monomer. Further examples of the amount of copolymerized high $T_g$ monomer include about 1 wt %, about 2 wt %, about 3 wt %, about 4 wt %, about 5 wt %, about 6 wt %, about 7 wt %, about 8 wt %, about 9 wt %, or a range between and including any two of these values. In some embodiments, the high $T_g$ monomer is selected from the group consisting of methyl methacrylate, ethyl methacrylate, phenyl methacrylate, isobornyl methacrylate, methacrylic acid, acrylic acid, cyclohexyl methacrylate, isobornyl acrylate, isopropyl methacrylate, styrene, vinyl acetate, and any two or more thereof.

In some embodiments of the latex of the present technology, the acrylic copolymer comprises at least about 1 wt % of copolymerized hydroxyl-containing acrylic monomer. For example, the acrylic copolymer may include about 1 wt % to about 9 wt % of copolymerized hydroxyl-containing acrylic monomer. Further examples of the amount of copolymerized hydroxyl-containing acrylic monomer include about 1 wt %, about 2 wt %, about 3 wt %, about 4 wt %, about 5 wt %, about 6 wt %, about 7 wt %, about 8 wt %, about 9 wt %, or a range between and including any two of these values. In some embodiments, the hydroxyl-containing acrylic monomer is selected from the group consisting of 2-hydroxyethyl methacrylate, 2-hydroxyethyl acrylate, 3-hydroxypropyl methacrylate, 3-hydroxypropyl acrylate, and any two or more thereof.

In some embodiments of the latex of the present technology, the acrylic copolymer further comprises a cross-linker wherein the cross-linker is copolymerized acrylic monomer containing two or more carbon-carbon double bonds. The acrylic copolymer may include, e.g., from about 0.1 parts per hundred parts monomer (phm) to about 1 phm of the cross-linker. Further examples of the amount of cross-linker include about 0.1 phm, about 0.2 phm, about 0.3 phm, about 0.4 phm, about 0.5 phm, about 0.6 phm, about 0.7 phm, about 0.8 phm, about 0.9 phm, about 1 phm, and ranges between and including any two of these values. In some embodiments, the cross-linker is selected from the group consisting of allyl methacrylate, allyl acrylate, ethylene glycol diacrylate, butanediol acrylate, 1,6-hexanediol diacrylate, and any two or more thereof.

Latex of the present technology may include a surfactant, e.g., sodium dodecyl sulfate, sodium dodecyl benzene sulfate, TRITON and any two or more thereof. The surfactant may be present in an amount from about 0.5 phm to about 3 phm. Examples of the amount of surfactant include about 0.5 phm, about 0.75 phm, about 1 phm, about 1.5 phm, about 2.0 phm, about 2.5 phm, about 3 phm, and ranges between and including any two of these values.

Lattices of the present technology may have a wide range of gel contents. For example the latex may be gel-free. In some embodiments, the latex may have a gel content of at least about 20 wt %. In others it may have a gel content of at least about 60 wt %. Examples of other gel contents of lattices of the present technology include about 10 wt %, about 20 wt %, about 25 wt % about 30 wt %, about 40 wt %, about 50 wt %, about 60 wt %, about 700 wt %, about 80 wt %, about 90 wt %, about 100 wt %, and ranges between and including any two of these values.

In some embodiments of lattices of the present technology, the amount of the sol polymers having a $M_W$ greater than twenty times the $M_e$ of the acrylic copolymer is about 20 wt % or less than 20 wt %.

The latex of claim 1 wherein the latex is an adhesive. The latex of claim 1 wherein the latex is a pressure sensitive adhesive.

In another embodiment of a latex of the present technology, the acrylic copolymer includes copolymerized monomers of 92-98 wt % butyl acrylate, 1-4 wt % methyl methacrylate, and 1-4 wt % 2-hydroxyethyl methacrylate.

In another aspect, there are provided methods for manufacturing lattices of the present technology. The methods include polymerizing a monomer emulsion comprising water, a low $T_g$ acrylic monomer, a high $T_g$ monomer, a hydroxyl-containing acrylic monomer, to provide a latex comprising a mixture of microgels and sol polymers of an acrylic copolymer. Any of the types and amounts of monomers described herein may be used. In some embodiments of the methods, the $M_c$ of the acrylic copolymer is greater than or equal to the $M_e$ thereof; the $M_w$ of the sol polymers is greater than or equal to twice the $M_e$ of the acrylic copolymer; the amount of sol polymer having a $M_w$ less than twice the $M_e$ of the acrylic copolymer is about 20 wt % or less than 20 wt %.

The monomer emulsion of the present methods may contain additional additives. In some embodiments, the monomer emulsion includes a surfactant, such as any of the types and amounts of surfactants as described herein. In certain embodiments, the monomer emulsion includes a chain transfer agent. The chain transfer agent may be 1-dodecane thiol and the like. In some embodiments of the present methods, the monomer emulsion includes a cross-linker as described herein.

In an illustrative embodiment, the polymerization is carried out by performing a seed polymerization of about 1 wt % to about 10 wt % of the total amount of monomers used, followed by addition of the remainder of the monomers at such a rate that at least about 80 wt % of the added monomers are converted to polymer within 1 minute of addition to the emulsion.

In another aspect, the present technology provides a film formed from any of the latex compositions described herein. The films may be prepared by casting a latex into a film and drying the film.

The present technology, thus generally described, will be understood more readily by reference to the following examples, which is provided by way of illustration and is not intended to be limiting of the present technology.

EXAMPLES

Materials and Characterization Methods

Butyl acrylate (BA), acrylic acid (AA), 2-hydroxyl methacrylate (HEMA), and methyl methacrylate (MMA) monomers, allyl methacrylate (AMA) cross-linker, 1-dodecanethiol (NDM) chain transfer agent (CTA), sodium dodecylsulfate (SDS) surfactant, sodium bicarbonate ($NaHCO_3$) buffer, potassium persulfate (KPS) initiator and hydroquinone (HQ) inhibitor were all obtained from Sigma-Aldrich and were used as supplied. All the above materials were reagent grade except HEMA, which had a purity of 97 wt. %. Distilled deionized (DDI) water was used throughout the study. Ammonia (30 wt. % in $H_2O$ for pH control) was obtained from British Drug House. All solvents used in the polymer characterization such as tetrahydrofuran (THF, HPLC grade, EMD Chemicals) and toluene (99.8%, Fisher Scientific), were also used as supplied by the manufacturer. Nitrogen gas (Linde Canada) was used to purge the reactor. PTFE porous membranes with pore size of 0.2 μm, for use in gel content measurements, were purchased from Cole-Parmer Canada.

The polymerization rate during the polymerization process was evaluated by both the instantaneous and overall monomer conversions, which were measured according to a standard gravimetric method as set forth in Qie, L., Dube, M. A., European Polymer Journal (2010) 46: 1225-36, incorporated by reference herein in its entirety.

Latex particle size and size distribution (PSD) were measured with a Dynamic Light Scattering (DLS) instrument (Malvern NanoS Zetasizer) with an angle of 176°. The reported diameter is an intensity-weighted average particle size. The polydispersity index values (PDI) given by the instrument reflect a narrower particle size distribution (PSD) with PDI values closer to 0.01. Latexes having a PDI smaller than 0.4 were considered to have a narrow particle size distribution. The detection range of the instrument was 0.6 nm-6 mm.

Gel content was tested with a modification of the membrane method by Tobing and Klein [1]. In particular, around 0.03 g dry polymer was weighed and sealed in a PTFE-coated membrane pouch. Then the membrane pouch was immersed into 25 mL THF in a 100 mL glass bottle. The bottle was then tightly capped and put on a shaker for 24 h. The membrane pouch was then removed and dried in a fume hood until it reached a constant weight. The weight of the remaining dry gel was taken and the gel content was calculated using:

Gel content=mass of the dry gel/mass of initial dry polymer

The THF solution remaining from the gel content test was concentrated, if necessary, and analyzed for the $M_w$ of sol polymer. The solution was filtered using a 0.45 μm syringe PTFE filter (Pall Corporation) and then analyzed with a Waters Gel Permeation Chromatography (GPC) instrument equipped with a Differential Refractive Index detector, a manual injector and three Waters Styragel columns (HR6, HR4, and HR3) in series. THF was used as the eluent and the flow rate was set at 0.3 mL/min. The internal temperature was set at 37° C. The data were analyzed using Empower 2 software from Waters. The calibration curve included a set of 12 polystyrene standards (EasiCal from Polymer Laboratories) with a range of 162-6,035,000 g/mol. The Mark-Houwink parameters of the polymers from runs 1-7, K and β, for the universal calibration method were chosen as those of the polyBA, in view of the BA concentration in the copolymer (96 wt. %). The K and α for polyBA are $1.1 \times 10^{-4}$ dL $g^{-1}$ and 0.708 respectively.

The $T_g$ was measured with a differential scanning calorimeter (Model Q1000 from TA Instruments) with a temperature sweep range of −80 to 80° C. in order to avoid reaction between AA and HEMA at elevated temperatures.

Mc was determined as follows. To measure Mc, about 0.03 g of dry gel polymer was weighed and put in a 15 mL glass vial with a diameter of ~10 mm, and then 10 mL toluene was added. The bottle was then tightly sealed with a plastic cap and put on a shaker for 0.5 h, to swell the polymer. To calculate Mc, the following equation was used:

$$M_c = \{V_1 \rho_p [\phi^{1/2} - \phi/2]\} / \{-[\ln(1-\phi) + \phi + \chi \phi^2]\}$$

where $V_1$ is the molar volume of toluene, 106.3 cm$^3$/mol; and $\rho_p$ is the density of polymer (1.06 g/cm$^3$ and 1.19 g/cm$^3$ for PBA and PMMA, respectively, 1.073 g/cm$^3$ for the BA/MMA (90/10 by weight) copolymer). $\phi$ is the volume fraction of gel polymer in the swollen gel and can be calculated as follows:

$$\phi = \{W_p \rho_s\} / \{W_p \rho_s + W_s \rho_p\}$$

where $W_p$ and $W_s$ are the weight fractions of the gel polymer and solvent (toluene) in the swollen gel, respectively. $\rho_s$ and $\rho_p$ are the densities of solvent (0.8669 g/cm$^3$) and polymer, respectively. $\chi$ is the polymer and solvent interaction parameter, and can be calculated as:

$$\chi = 0.34 + \{V_1(\delta_1 - \delta_2)\}/RT$$

$\delta_1$ is the solubility parameter of the BA/MMA copolymer. As the solubility parameter value of poly(butyl acrylate) (hereafter referred to as PBA) is 8.9 (cal/cm$^3$)$^{1/2}$, that of poly(methyl methacrylate) (hereafter referred to as PMMA) is 9.2 (cal/cm$^3$)$^{1/2}$, $\delta_1$ should be 8.93 (cal/cm$^3$)$^{1/2}$ for the BA/MMA (90/10 by weight) copolymer; and $\delta_2$ is the solubility parameter for toluene, 8.9 (cal/cm$^3$)$^{1/2}$.

The values of $M_e$ were obtained as follows: (1) Calculate the $M_e$ of a monodisperse copolymer of BA/MMA with weight ratio of 90/10 with the following equation.

$$M_{e\,copolymer,monodisperse} = W_{BA} \times M_{e\,PBA,monodisperse} + W_{PMMA} \times M_{e\,PMMA,monodisperse} \quad (11)$$

where the $M_e$ of monodisperse poly(butyl acrylate) (referred to as PBA) is 20,773 g/mol [1], $M_e$ of poly(methyl methacrylate) (referred to as PMMA) is 10,013 g/mol, so $$M_{e\,copolymer,monodisperse} = 0.9 \times 20{,}773 + 0.1 \times 10{,}013 = 19{,}697 \text{ g/mol}$$

(2) Calculate the $M_e$ for the present polydisperse polymers using the following plastic model:

$$M_{e,polydisperse} = M_{e,monodisperse}/\phi^{2.3}$$

where $\phi$ is the weight fraction of polymers having $M_w$ greater than the $M_e$ of the monodisperse sample.

PSA performance, including loop tack, peel strength and shear strength, was evaluated according to the Pressure Sensitive Tape Council standards PSTC-6, PSTC-1 and PSTC-7, respectively. PSA film thickness was measured as ~33 µm. The latex was filtered using glass wool and cast onto a 50 µm MYLAR sheet with a 30# Meyer rod. The cast film was dried at room temperature and conditioned for 24 h at standard conditions of temperature and humidity (23±1° C. and 50%±5% Relative Humidity). A Universal Instron tester was used to evaluate loop tack and peel strength. For tack, a strip of 25.4 mm×177.8 mm was cut from the film and was formed into a loop with the adhesive side facing outward. Approximately 25.4 mm at both ends of the strip was masked with tape and inserted into the upper grip. The instrument moved the upper grip downward at a speed of 300 m/min until an area of 25.4 mm$^2$ came into contact with the stainless steel substrate mounted into the lower grip. Next, the tester moved the upper grip upwards at the same speed while recording the force needed to de-bond the loop from the substrate. The maximum force per meter necessary to remove the adhesive was reported as loop tack. PSTC 1 Test Method A evaluates peel strength at a peel angle of 180°. A PSA film specimen of 25.4 mm×304.8 mm was cut. The strip was laminated onto a stainless steel substrate with the help of a 2040 g roll coater. The roll coater was passed through the film front to back twice (i.e., along the length of the film). The dwell time did not exceed one minute. The substrate and the strip were inserted into the grips and the upper grip was set to move upward at a speed of 300 mm/min. The average force per m required to peel the strip from the substrate was recorded and reported as peel strength. Lastly, PSTC 7 measures shear strength. A specimen of 25.4 mm×152.4 mm of the film was cut. The strip was laminated onto a stainless steel substrate with a contact area of either 25.4 mm×25.4 mm or 12.7 mm×12.7 mm, and then placed in the home-built shear tester using a C-clamp. A 500 g weight was suspended at the end of the strip. The time to failure was recorded automatically using Labview™ software.

PSA viscoelastic properties were characterized using dynamic mechanical analysis (DMA) with a RDA III rheometer (TA Instruments). The geometry used was a pair of 25-mm parallel plates, and the sample thickness was 1.8±0.2 mm. PSA samples were prepared as follows: First, a certain amount of latexes were put in home-made silicon release paper dishes (3.5 cm×3.5 cm). Then, the latexes were dried for about 4 weeks to obtain PSA films with constant weight as well as a thickness of about 0.6 mm. Finally, three of these films were pressed together with the DMA plates to form one PSA sample with a thickness of ~1.7-1.8 mm. The frequency sweep tests were performed at 23 and 83° C. over a frequency range of about 80 to 0.02 Hz, under a compression mode and with a strain of 1%. A frequency master curve was built using the time-temperature superposition method and with the data at 23° C. as the reference. Temperature sweep curves were measured by heating the sample from −30 to 180° C. at a rate of 3° C. m$^{-1}$ and under a shear frequency of 1.591 Hz.

Example 1

Polymerization Procedure

A seeded semi-batch emulsion polymerization process was adopted to produce all the latexes in this study. It included three stages: a batch stage to produce seed latexes, a continuous feeding stage to grow latex particles, and a cook stage to react the remaining monomers. The polymerization formulation is shown in Table 1. The amounts of CTA and cross-linker were varied as listed in Table 2. To start the polymerization, all the initial charge except for the initiator solution and monomers was added to a 1 L METTLER-TOLEDO LABMAX reactor at room temperature. The reactor vessel was made of stainless steel, and equipped with an anchor stirring blade as well as several feeding and sampling ports. The stirring speed was maintained at 250 rpm throughout the polymerization process. The reactor temperature was then increased to 70° C. within 30 min, then the monomer mixture and initiator solution were added. The temperature was immediately raised to 75° C. within 5 min, and maintained at 75° C. for 10 min for the seed latex production stage. Next, the monomer emulsion and initiator solution (see Table 1) were fed to the reactor using two separate metering pumps at constant rates and feeding times of 2.5 and 3 h, respectively. At the completion of the feed stage, the polymerization was continued for an additional 50 min in order to react the remaining monomers (i.e., the cook stage). The latex was then cooled to below 30° C. and HQ was added to quench the polymerization. The latex was then separated into two roughly equal portions. One portion had its pH adjusted to ~3.0 and the other to ~5.5 with ammonia. The solids content of the latexes were adjusted to ~45 wt % by adding DI-H$_2$O, in order to modify the latex viscosity and therefore produce good PSA films.

TABLE 1

Latex polymerization formulations.

| Formulation Component | Initial charge (g) | Feeding (g) Monomer emulsion | Initiator solution |
|---|---|---|---|
| H$_2$O | 202/15* | 89 | 90 |
| KPS | 0.4 | — | 0.90 |
| BA | 11.58 | 324.48 | — |
| AA | — | 6.76 | — |
| HEMA | — | 6.76 | — |
| MMA | 0.42 | — | — |
| NDM | — | 0-0.4 phm** | — |
| AMA | — | 0-0.2 phm** | — |
| SDS | 0.45 | 4.25 | — |
| NaHCO$_3$ | 0.05 | — | — |

*Water used for initiator solution in seed production stage.
**phm = parts per hundred parts monomer, varied as indicated in Table 2.

TABLE 2

BA/AA/HEMA latexes (weight ratio 96/2/2) and their polymer microstructures.

| Latex ID* | NDM (phm) | AMA (phm) | Gel content (wt. %) | $M_w$ | $M_n$ ($\times 10^{-3}$ g/mol) | $M_c$ | $M_e$ |
|---|---|---|---|---|---|---|---|
| 1B | 0.20 | 0 | 0 | 252 | 48 | — | 26 |
| 2B | 0.15 | 0 | 13 | 470 | 66 | — | 22 |
| 3B | 0.10 | 0 | 36 | 656 | 78 | — | 22 |
| 4B | 0.05 | 0 | 51 | 443 | 105 | 82 | 21 |
| 5B | 0 | 0 | 75 | 217 | 70 | 59 | 21 |
| 6B | 0.40 | 0.20 | 49 | 113 | 28 | 38 | 27 |
| 7B | 0.20 | 0.20 | 74 | 87 | 42 | 20 | 23 |

*"B" in the Latex ID signifies that the pH of the latex was adjusted to pH ~5.5.

During the polymerization process, samples were taken at feed times of 0, 20, 50, 100, 150, and 180 min, as well as at the end of the polymerization. These samples were used to monitor particle growth as well as monomer conversion.

Results and Discussion

Influence of CTA and Cross-Linker on the Polymerization Process and Latex Properties The polymerization formulations of Runs 1-7 are shown in Tables 1 and 2 above. Runs 1-5 employed only CTA (NDM, 0.2 to 0 phm), while Runs 6 and 7 used CTA (NDM) and cross-linker (AMA) simultaneously.

It was observed that for all runs, particle size increased over the course of the feeding stage of the polymerization, and the particle size remained essentially constant thereafter, until the end of the cooking stage. In addition, no secondary nucleation or coagulation was detected during the entire polymerization process. The final latexes of all runs had z-average particle diameters of ~143±3 nm. No significant influence of CTA and cross-linker on particle growth was observed. (Data not shown.)

The instantaneous vs. overall monomer conversion curves of all the runs were almost identical. (Data not shown.) It is clear that CTA and cross-linker had no significant influence on polymerization rate.[1] In addition, all runs were carried out under monomer-starved conditions, i.e., the instantaneous monomer conversion was >90 wt % for most of the polymerization process. Thus, a homogeneous polymer composition was achieved for all runs. This was confirmed by DSC measurements which exhibited only a single peak ($T_g$ of about −45° C.) for the polymer sample tested.

Polymer microstructure results for the latexes from Runs 1 through 7 are shown in Table 2 above. (Note: The latexes were named according to their run number.) Latexes 1 through 5 were produced with varying CTA levels with no cross-linker added, whereas latexes 6 and 7 were produced using both CTA and cross-linker. The result was a series of latexes with markedly different microstructures.

The effect of CTA on the polymer microstructure is shown in Table 2. In the absence of cross-linker, the decrease in CTA concentration from 0.2 to 0 phm (Runs 1-5) resulted in an increase in gel content from 0 to 75 wt %, as well as a decrease in $M_e$. This was because less CTA led to the generation of larger primary polymer chains and a correspondingly higher probability for these chains to grow into gel polymers. In contrast, the $M_w$ of sol polymers first increased from 252 kg mol$^{-1}$ (i.e., at 0.2 phm NDM, gel content: 0 wt %) to a maximum of 656 kg mol$^{-1}$ (i.e., at 0.1 phm NDM, gel content: 36 wt %) then decreased to 217 kg mol$^{-1}$ (i.e., at 0 phm NDM, gel content: 75 wt %). This change in $M_w$ can be explained as follows. In the CTA concentration range 0.2 to 0.1 phm, most of the primary polymers became sol polymers, accounting for the low gel content of the latexes. As the primary polymers became larger with the decrease in CTA concentration, the sol polymer also became larger (i.e, larger $M_w$). In contrast, when the CTA concentration is smaller than 0.1 phm, most of the primary polymers, grew so large that they became gel polymers, accounting for the high gel content; leaving fewer, smaller polymers as sol polymers.

The influence of the cross-linker can be seen by comparing the latex microstructure of Runs 7 and 1, which employed the same amount of CTA (NDM, 0.2 phm), but a different amount of cross-linker (Run 1: 0 phm AMA; Run 7: 0.2 phm AMA). From Table 2, one can observe that the addition of 0.2 phm AMA significantly increased the gel content from 0 to 74 wt %. At the same time, the $M_w$ greatly decreased from 252 to 87 kg·mol$^{-1}$. Thus, the addition of cross-linker significantly increased the opportunity for primary polymer chains, especially the larger ones, to engage in further growth due to the introduction of double bonds. Most of these primary polymer chains grew into gel polymers, and therefore the gel content greatly increased and $M_w$ of the sol polymers decreased.

Comparing Run 6 to Run 7 allows us to observe the effect of CTA on the polymer microstructure in the presence of the same amount of cross-linker (AMA: 0.2 phm). From Table 2, one can observe that increasing the amount of CTA from 0.2 (Run 7) to 0.4 phm (Run 6) led to a decrease in gel content from 74 to 49 wt %, an increase in $M_c$ from 20 to 38 kg ma', and an increase in $M_w$ from 87 to 113 kg mol$^{-1}$. With a smaller amount of CTA, the average size of the primary polymer chains in Run 7 was relatively larger than that in Run 6. Due to their larger average size, most of the primary polymer chains in Run 7 (i.e., the larger ones) underwent further growth and eventually became gel polymers, while a small amount of these chains (i.e., the smaller ones) became sol polymers. In contrast, because the primary polymers in Run 6 were significantly smaller, the majority of the chains did not become gel polymer even after multiple further growths at the pendent double bonds and then termination. Instead they grew into highly branched polymers and became sol polymer together with those ingrown small primary polymer chains. Thus, the $M_W$ of latex 6 was larger than that of latex 7. This presence of branched sol polymers was also reflected in the breadth of the molecular weight distribution (MWD): polydispersity index (PDI) for latex 6=4.0 and PDI for latex 7=2.1.

The larger $M_c$ of the gel of latex 6 can be explained as follows. During the polymerization, the branched polymer radicals generated via further growth of primary polymers could be terminated with other branched polymer radicals. In this case, the double bonds from which the branched radicals grew became cross-linking points, if the resulted polymer is sufficiently large as gel polymer. The branched polymer radicals could also be terminated by chain transfer to CTA, and in this case, the corresponding double bonds connected to the branched radicals will turn into branching points. As Run 6 used more CTA, more double bonds became branching points instead of cross-linking points. Accordingly, the $M_c$ of the gel of latex 6 was larger than that of latex 7.

Comparing Run 4 to Run 6 and Run 5 to Run 7, one can see that latexes with similar gel contents but much smaller $M_w$ and $M_c$ can be produced by simultaneously increasing the CTA and cross-linker concentrations (see Table 2). The molecular weight distribution of the sol polymers of these latexes are shown in FIG. 1. To explain these microstructural changes, one can refer to the polymerization process analysis explained earlier. At higher CTA concentrations, the average size of the primary polymer chains would be much smaller and this would lead to a much smaller $M_w$. At higher cross-linker concentrations, more pendent double bonds would be present in the primary polymer chains. As a result, there would be more cross-linking points in the final latex polymers and hence, $M_c$ would be lower. If one increases the concentrations of CTA and cross-linker simultaneously, the effect of increasing the CTA concentration could counterbalance that of increasing the cross-linker concentration with respect to the gel content under appropriate conditions. Therefore, latexes with similar gel contents could be produced.

Influence of Latex pH and PSA Microstructure on PSA Viscoelastic Properties

As mentioned above, latexes 1-7 were each divided into two portions, with the pH of one portion adjusted to 3 and the other to 5.5. The PSAs obtained from these latexes are referred to according to the run number and pH of the latex (A: pH=~3.0, B: pH=~5.5). The viscoelastic properties of these PSAs were measured via frequency sweeps using DMA. It was found that increasing the latex pH from 3 to 5.5 did not significantly affect the viscoelastic properties of the corresponding PSAs. Hereafter, for the purpose of consistency, the viscoelastic properties were reported only for the PSAs made from latexes with a pH of 5.5.

Figure 3:
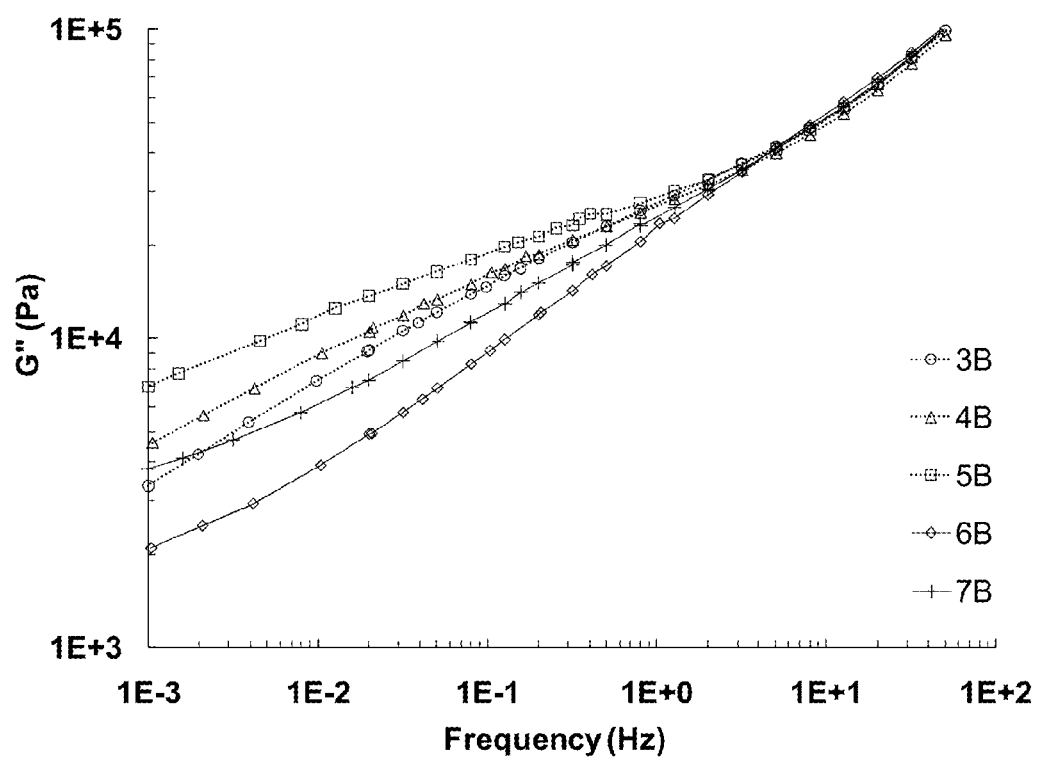
FIG. 3 depicts a graph of loss moduli of PSAs 3B through 7B of Example 1.
Figure 4:
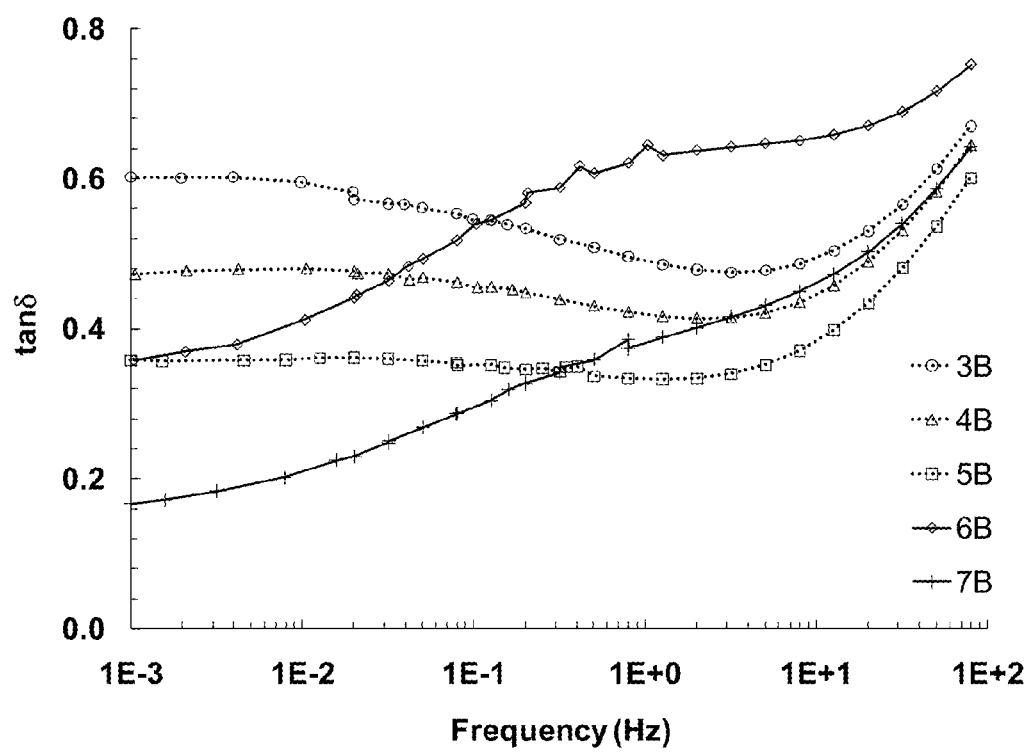
FIG. 4 depicts a graph of tan δ of PSAs 3B through 7B of Example 1.
Figure 5:
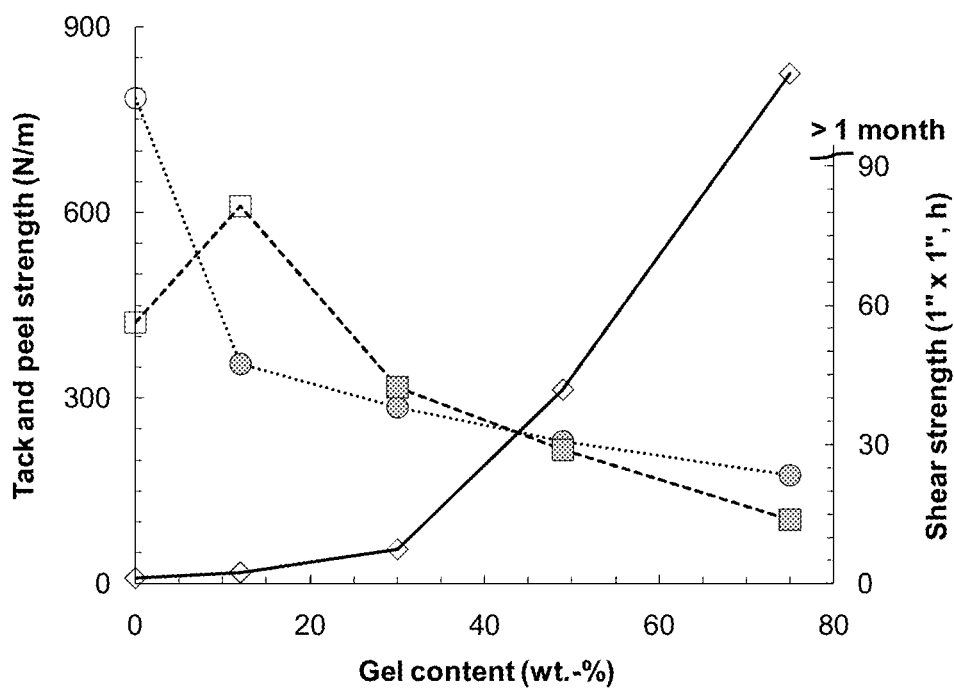
FIG. 5 depicts a graph showing the performance of PSA films 1A through 5A of Example 1. (Circle: tack; square: peel strength; diamond: shear strength. For tack and peel strength tests: open symbols refer to cohesive failure while solid symbols refer to adhesive failure).

The frequency sweep master curves built by using data at 23° C. as the reference are shown in FIGS. 3-5. The tested range was from about $10^2$ to $10^{-3}$ Hz because PSA performance is related to the viscoelastic properties exhibited in this range.

Figure 2:
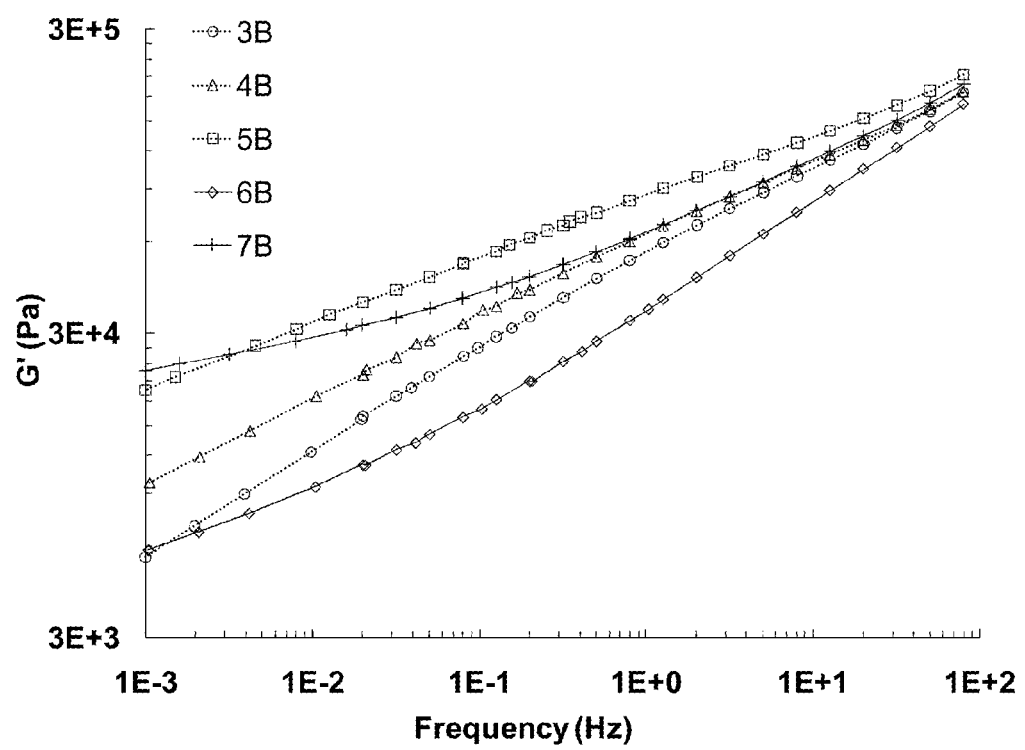
FIG. 2 depicts a graph showing storage moduli of PSAs 3B through 7B of Example 1.

FIGS. 2 through 4 compare the molecular weight distribution of sol polymers and viscoelastic properties of various PSAs of the present technology. PSA 3B, 4B and 5B, have increasing gel contents and were all cast with latexes produced in the absence of cross-linker. At any given frequency, the moduli of these PSAs increased with gel content, and the magnitude of the increase was larger at lower frequencies, except for G" at the very early stage of the plateau zone. This phenomenon arises because, with an increase in gel content, the PSA has a greater capacity to resist deformation by shear forces. The larger moduli differences at lower frequencies (i.e., $1\times10^{-3}$ Hz) compared to that at higher frequencies (i.e., 80 Hz) are related to the disentanglement of the polymer chains at the lower frequency range, which lies in the terminal flow region. A PSA containing less gel undergoes greater disentanglement compared to PSAs with higher gel contents. Hence, its resistance to deformation decreases much more than the higher gel content PSA. As mentioned earlier, G" exhibited unique behavior in the range of ~80 to 10 Hz, where the G" of these PSAs were very similar, and did not exhibit influence from the polymer microstructure. This phenomenon was probably associated with the well known delayed behavior of G" compared with that of G'. In the very early stage of the plateau region (i.e., 80 to 10 Hz), G' already shows the influence of polymer microstructure, while the G" does not and still behaves as in the glass transition zone. FIG. 4 shows that the tan δ of PSA 3B though 5B increased with a decrease in gel content, and the magnitude of the increase was greater at lower frequencies. The larger tan δ of the lower gel content PSAs was due to its more liquid-like behavior. The much larger tan δ differences at lower frequencies also relate to polymer chain disentanglement which occurred in this region. Comparing PSAs 6B and 7B (see FIGS. 3-4), which were generated from latexes produced with both CTA and cross-linker, one can observe the same influences of gel content on moduli and tan δ.

The viscoelastic properties of PSAs with similar gel contents, but different $M_c$ and $M_w$, are demonstrated in the present PSAs. FIGS. 2 and 3 show that at similar gel contents, the PSAs produced in the absence of cross-linker (i.e., PSA 4B or 5B) have much larger G' and G" than their respective counterparts (6B or 7B) in almost the entire studied range. The much larger G' and G" was likely due to better entanglement between the microgels by sol polymers in PSAs 4B and 6B. The enhanced entanglements in PSA 4B and 5B, respectively, compared to their counterparts, can be concluded from the following facts: (1) The $M_c$ and $M_w$ of PSA 4B and 5B are respectively much larger than those of PSA 6B and 7B. (2) For PSA 7B, the $M_c$ is smaller than $M_e$, so the connection between the microgels by sol polymers is almost impossible in this PSA. (3) In PSA 6B, a larger amount of the sol polymers are hyper-branched, and according to Dealy and Larson, these types of polymer chains generally cannot provide good entanglement because of the short segments between branch points. The better entanglement in PSA 4B and 5B led to enhanced cohesive strength and accordingly, larger moduli.

Table 2 and FIG. 1 show that the amount of very small sol polymers (i.e., <$M_e$) in PSA 4B and 5B was very low (i.e., ~2 wt % of the total sol polymers), but much larger in PSA 6B and 7B (i.e., from ~16 wt % to 24 wt % of the total sol polymer). These small sol polymers cannot entangle with other polymer chains. In addition, the small sol polymers act like plasticizers and greatly decrease a PSA's capability to resist deformation. Hence, smaller amounts of very small sol polymers also contributed to the larger moduli of PSAs produced in the absence of cross-linker. The slightly lower G' of PSA 5B, compared to that of PSA 7B at the lower frequency end (i.e., ~0.001 Hz) is related to the disentanglement in this terminal flow region. Since there are more entanglement points in PSA 5B than 7B if no disentanglement occurred, the loss of entanglement points should be larger for PSA 5B than 7B when disentanglement occurs. Hence, around the lower frequency, the deformation resistance of PSA 5B decreased to the same level of that of PSA 7B, and led to a similar G' at around 0.001 Hz.

From FIG. 4, one can see that the tan δ curves of PSAs produced by using both CTA and cross-linker (i.e., PSA 6B and 7B) were very different from that produced in the absence of cross-linker (i.e., PSA 3B-5B). First, the tan δ of PSAs 3B-5B all showed a noticeable minimum point (i.e., ~5 Hz), but those of PSAs 6B and 7B did not. The minimum point is often used to identify the midpoint of the plateau zone, a zone which only exists for polymer materials having good entanglements and capable of recoverable stretching. The absence of this minimum point in PSA 6B and 7B further confirmed the presence of fewer entanglements between polymer chains in the PSAs produced by using CTA and cross-linker simultaneously. Secondly, the tan δ curves of PSAs produced using both CTA and cross-linker (i.e., PSA 6B and 7B) were very different from those of PSAs produced in the absence of cross-linker (i.e., PSA 4B and 5B). At the higher frequency range (i.e., ~80 to 0.3 Hz), the tan δ value of PSA 4B and 5B are much smaller than their respective similar gel content counterparts, PSA 6B and 7B. This range roughly corresponds to the plateau zone. In this range, larger polymer chain segments or very small sol polymers (all <$M_e$) have τ similar to t, therefore the strain mainly resulted by their movement. Specifically, for PSA 4B and 5B, the strain was almost totally due to the large polymer chain segments, while for PSA 6B and 7B, a large portion of the strain was due to the very small sol polymers. The reason is that there are significant amounts of very small sol polymers in PSA 6B and 7B (see Table 2). The movement of very large polymer chains (<$M_e$) does not involve disentanglement of polymer chains and therefore movement between whole polymer chains. As a result, most of the exerted energy on the PSAs is recoverable, leading to smaller tan δ for PSAs produced in the absence of cross-linker (i.e., PSA 4B and 5B). In contrast, the movement of very small sol polymer (<$M_e$) will cause relative movement between whole polymer chains, thereby leading to unrecoverable strain and correspondingly larger tan δ for PSAs produced by using both CTA and cross-linker (i.e., PSA 6B and 7B). In the lower frequency region (i.e., ~0.7 to 0.001 Hz), the PSAs produced in the absence of cross-linker (i.e., PSA 4B and 5B) showed higher tan δ than their similar gel content counterparts. This trend is different from what was observed in the higher frequency range. The low frequency range roughly falls in the terminal flow region and disentanglement between polymer chains related to movement of very large polymer chain segments (>$M_e$) could occur. As the $M_w$ and $M_c$ of PSAs produced in the absence of cross-linker (e.g., PSA 4B and 5B) were much larger than their counterparts (i.e., PSA 6B and 7B), PSA 4B and 5B should have experienced greater disentanglement. It is known that disentanglement could dissipate a significant amount of energy. Consequently, in the lower frequency range, the tan δ (the ratio of dissipated energy to stored energy) was larger for the PSAs produced in the absence of cross-linker than their respective similar gel content counterparts.

PSA Performance

Latexes 1-5 (pH 3.0) were cast as PSA films with thicknesses of ~33 μm. Their tack, peel strength and shear strength are shown in FIG. 5. (Note: PSAs are referred to according to the run number and pH of the latex; A: pH=3.0, B: pH=5.5.)

The tack test showed cohesive failure at a gel content of zero and adhesive failure at larger gel contents (see FIG. 5). Tack decreased with increasing gel content. Peel strength tests showed cohesive failure at gel contents of 0 and 13 wt %, and adhesive failure at larger gel contents (see FIG. 5). With the increase in gel content, peel strength showed an initial increase to a maximum at 13 wt % gel content followed by a decrease. Shear strength increased with gel content. Higher gel content endows a PSA with lower deformation and flow ability as well as higher cohesive strength. It is known that a PSA's shear strength is mainly affected by its cohesive strength and that higher cohesive strength usually results in larger shear strengths.

Peel strength testing involves both a bonding and a debonding process. It is a function of how well the PSA wets the substrate during the bonding process and how much energy is dissipated during the debonding process. All things being equal (e.g., composition and $T_g$), a lower gel content endows a PSA with enhanced ability for deformation and flow, and therefore improved wetting during the bonding process. The amount of energy dissipated during the debonding process is primarily affected by the strain experienced by the PSA, which is related to fibril formation and growth; the larger the strain, the larger the amount of energy dissipated.

Among PSAs 1A to 5A, PSA 2A (gel content: 13 wt %) resulted in a maximum peel strength, which implies that this PSA should have experienced a maximum strain during debonding compared to the other PSAs. To confirm this, we analyzed the strains in light of the following concepts: (1) fibril formation is associated with elongation of PSA polymers in the tensile direction; (2) Higher gel contents and tighter gel networks decrease fibril length. First, PSA 2A had a much larger $M_w$(~20 $M_e$, see Table 2) compared to that of PSA 1A (~10 $M_e$, see Table 2; gel content=0 wt %) as well as a very loose gel structure. $M_c$ could not be measured for PSA 2A, as its swollen gel was very fragile and broke during testing. The gel in PSA 2A would not be expected to affect fibril formation and growth considering its low concentration and very loose microstructure. Hence, the higher $M_w/M_e$ ratio of PSA 2A should have led to longer fibrils (larger strain) compared to PSA 1A, and accordingly a larger strain. Additional evidence that maximum strain occurred with PSA 2A can be ascertained by comparing PSAs 3A, 4A and 5A. With increasing gel content (from 3A to 5A, see Table 2) the gel network became tighter, and beyond a certain gel content (e.g., >36 wt %), $M_w$ became smaller. This should result in shorter fibrils and smaller strains with increasing gel content. PSA 2A showed higher peel strength than PSA 1A, despite the lower gel content and consequently better wetting during the bonding process of the latter. This was because the positive effect of larger strain during debonding on peel strength dominated the negative effect of less wetting during bonding. Comparing PSAs from 2A through 5A, with the increase in gel content, wetting of the substrate became worse and the dissipated energy also decreased due to the reduction of strain. Therefore, the peel strength decreased with increasing gel content (see FIG. 5).

Tack testing also involves both a bonding and a debonding process. However, compared to the peel strength test, the tack test features a much shorter contact time and a much smaller applied pressure during the bonding process. Hence, the wetting capability of a PSA affects tack more than peel strength and as expected, tack decreased with gel content (see FIG. 5). No maximum in tack was observed simply because the energy dissipation effect was not as strong for PSA 2A as in the case of the peel strength test.

Figure 6:
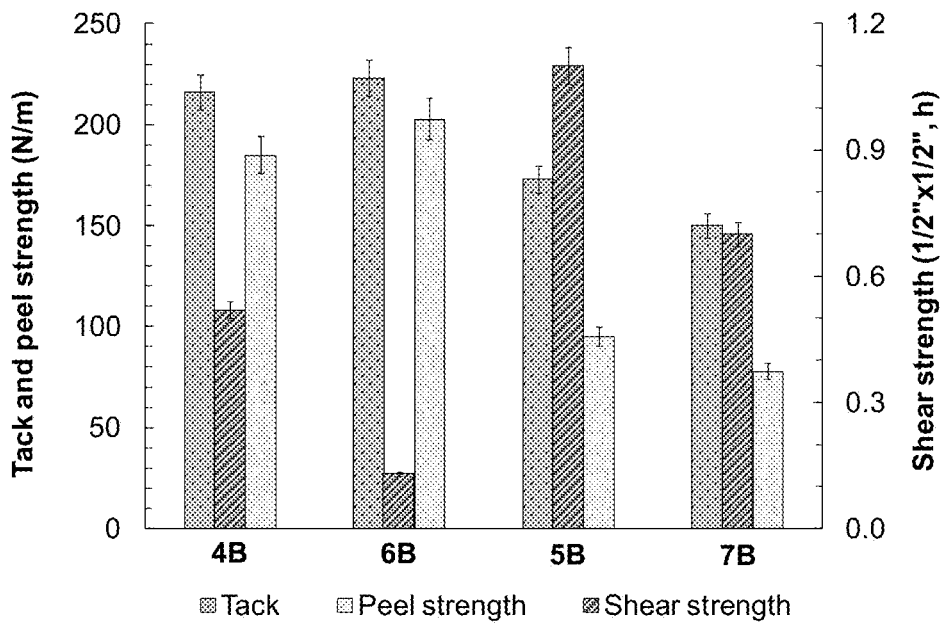
FIG. 6 is a bar graph showing the adhesive performance of PSAs 4B through 7B of Example 1.
Figure 7:
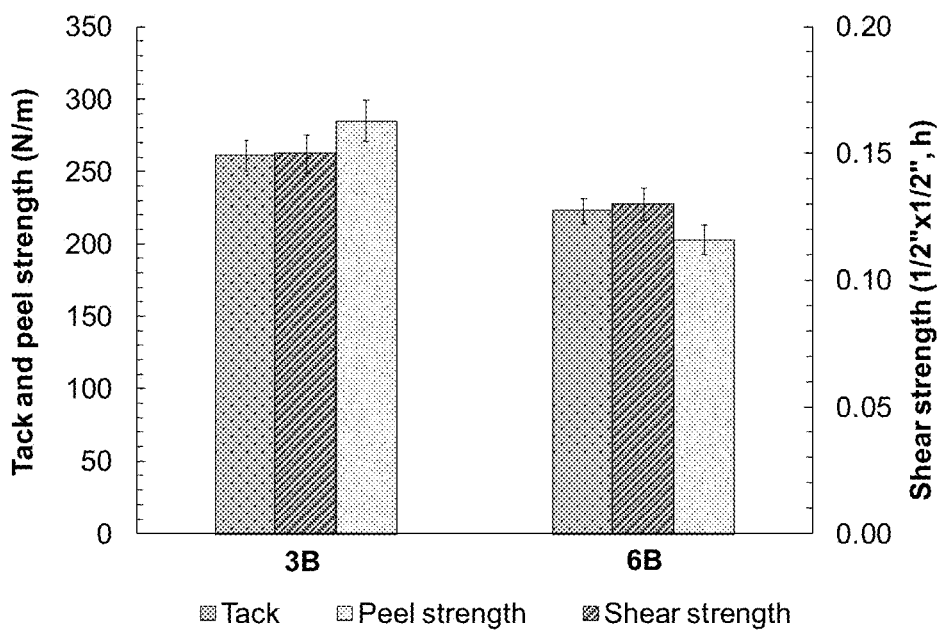
FIG. 7 is a bar graph showing the adhesive performance of PSA 3B and 6B of Example 1.

To study the influence of polymer microstructure on PSA performance at similar gel contents, PSA 4B was compared to PSA 6B and PSA 5B was compared to PSA 7B as shown in FIG. 6. It can be seen that PSAs with much larger $M_c$ and $M_w$ (i.e., PSA 4B or 5B) showed similar tack and peel strength, as well as much larger shear strength, compared to their similar gel counterparts with smaller $M_c$ and $M_w$ (i.e., PSA 6B or 7B). During shear strength testing with a contact area of 1"×1", both PSAs 5B and 7B did not show any signs of falling even beyond 1 month. Hence, a contact area of ½"×½" was also used. In addition, with FIG. 7, one can compare PSA 3B, which was produced in the absence of cross-linker, with PSA 6B, which was produced with both CTA and cross-linker. With lower gel content but significantly larger M, PSA 3B (gel content: 36 wt %, $M_w$: 656 kg·mol$^{-1}$) showed not only higher shear strength but also larger tack and peel strength, compared with 6B (gel content: 49 wt %, $M_w$: kg·mol$^{-1}$).

Peel strength behavior can be described using the following theory, which describes that peel strength is proportional to G" (debonding frequency, $\omega_1$)/G' (bonding frequency, $\omega_2$):

$$P \propto I \times G''(\omega_1)/G'(\omega_2) \qquad (2)$$

where P is peel strength, I is the surface interaction energy between a PSA and substrate, and $\omega_1$ and $\omega_2$ are the debonding and bonding frequency, respectively. Because $\omega_1$ and $\omega_2$ change with film thickness, they were corrected for the film thickness used in our study (33 µm) as shown below in Eq. 3-5. The G"($\omega_1$)/G'($\omega_2$) ratios are shown in Table 3 for PSAs 3B through 7B.

$$\omega = \frac{2\pi(\text{bonding rupture speed})}{(\text{adhesive thickness})} \frac{\text{rad}}{\text{s}} \qquad (3)$$

$$\omega_1 = 43 \frac{\text{rad}}{\text{s}} \times \frac{37 \ \mu m}{33 \ \mu m} \times 0.1592 \frac{\text{Hz}}{\left(\frac{\text{rad}}{\text{s}}\right)} = 78 \ \text{Hz} \qquad (4)$$

$$\omega_2 = 1 \frac{\text{rad}}{\text{s}} \times \frac{37 \ \mu m}{33 \ \mu m} \times 0.1592 \frac{\text{Hz}}{\left(\frac{\text{rad}}{\text{s}}\right)} = 0.179 \ \text{Hz} \qquad (5)$$

In Eq. 4, 435 rad·s$^{-1}$ and 37 nm are the reported debonding frequency and film thickness, respectively. 0.1592 is the factor for transfer 1 rad·s$^{-1}$ to Hz, and 78 Hz and 33 µm are the calculated debonding frequency for our test and the thickness of PSA films produced in this study, respectively. In Eq. 5, 1 rad·s$^{-1}$ and 0.179 Hz are the reported bonding frequency and the calculated bonding frequency in this study, respectively.

Table 3 shows the G"($\omega_1$) and G'($\omega_2$) data for PSA 3B-7B. Combining the information from Tables 2 and 3, one can see that for PSAs with similar gel contents, those with larger $M_c$ and $M_w$ had significantly smaller G"($\omega_1$)/G'($\omega_2$) than their counterparts with smaller $M_e$ and $M_w$ (i.e., PSA 4B vs. PSA 6B and PSA 5B vs. PSA 7B).

TABLE 3

Viscoelastic properties of PSA 3B-7B.

| | PSA ID | | | | |
|---|---|---|---|---|---|
| | 3B | 4B | 5B | 6B | 7B |
| G"($\omega_1$ = 78 Hz) kPa | 122.8 | 119.3 | 126.2 | 126.1 | 125.1 |
| G'($\omega_2$ = 0.179 Hz) kPa | 32.7 | 41.2 | 60.5 | 20.2 | 45.1 |
| G"($\omega_1$)/G'($\omega_2$) | 3.75 | 2.89 | 2.09 | 6.26 | 2.77 |
| G'(0.002 Hz) kPa | 7.0 | 11.6 | 22.5 | 6.7 | 24.3 |
| G"(0.002 Hz) kPa | 4.2 | 5.5 | 8.0 | 2.5 | 4.3 |
| G*(0.002 Hz) kPa | 8.2 | 12.9 | 23.9 | 7.1 | 24.7 |
| J(0.002 Hz) × 10$^5$ Pa$^{-1}$ | 12.2 | 7.8 | 4.2 | 14.1 | 4.1 |

In this study, the strains experienced by the PSAs during debonding were not measured due to equipment limitations. However, it could be predicted that at similar gel contents, the PSAs with larger $M_c$ and $M_w$ would experience larger strains compared with their counterparts with smaller $M_e$ and $M_w$. It is well known that the formation of fibrillar structures is associated with elongation of PSA polymers in the tensile direction. The much larger $M_c$ and $M_w$ of PSAs 4B and 5B, compared with their respective counterparts PSAs 6B and 7B, certainly favor larger elongation, and accordingly the formation of longer fibrils. In fact, we stretched the similar gel content PSAs manually, and found that the PSAs with much smaller $M_c$ and $M_w$ (i.e., PSA 6B or 7B) broke easily and at very small strains. Those with larger $M_c$ and $M_w$ (i.e., PSA 4B or 5B) showed very large strains at break. In addition, Zosel et al. found that fibrillation length decreases with increasing cross-link density, and more importantly, fibrillation will be completely inhibited when $M_c$ is smaller than $M_e$. Therefore, PSA 7B could not form fibrils (see Table 2). It is likely that PSA 5B could not form fibrils either, considering its very high gel content and the negative influence of gel content on fibrillation. Judging by the much larger elongation capability of PSA 5B compared to 7B, we could assume that PSA 5B experienced larger strain than PSA 7B, even though fibrils were not formed in both cases.

Table 3 also shows that the PSAs with larger $M_c$ and $M_w$ exhibited much larger storage modulus around the bonding frequency (i.e., G'($\omega_2$)), compared with their counterparts with smaller $M_c$ and $M_w$ (i.e., PSAs 4B vs. 6B, and PSAs 5B vs. 7B). Hence the former PSAs cannot wet the substrate as well as the latter ones. The negative effect of less wetting on tack and peel strength could be counterbalanced by the positive effect of the larger strains. A good example of this arises from the comparison of PSA 4B to PSA 6B. FIG. 6 showed that at a similar gel content of 50 wt %, the PSA with larger $M_c$ and $M_w$ (i.e., PSA 4B) showed similar tack and peel strength as its counterparts with smaller $M_e$ and $M_w$ (e.g., PSA 6B). At a similar gel content of 75 wt %, PSA 5B (larger $M_c$ and $M_w$) and PSA 7B (smaller $M_c$ and $M_w$) also showed similar tack and peel strength (see FIG. 6). In addition, the above reasoning could also explain the larger peel strength of PSA 3B (36 wt %, $M_w$ 656 kg mol$^{-1}$) compared to that of PSA 6B (gel content: 49 wt %, $M_w$: 113 kg mol$^{-1}$) (see FIG. 7). In this case, the positive effect of larger strain dominated the negative effect of less wetting.

The PSA viscoelastic properties are useful when considering shear strength differences. Shear strength usually increases with G' at 0.01 rad·s$^{-1}$ (0.002 Hz). FIG. 2 and Table 3 show that at this frequency, the G' of PSA 4B was significantly larger than that of PSA 6B, while the G' of PSA 5B was slightly lower than that of PSA 7B. At similar gel contents, the much larger shear strength of PSAs with larger $M_c$ and $M_w$ could be explained by Chang's theory (e.g., PSA 4B vs. 6B, gel content: 50 wt %); while this was not the case for greatly differing gel contents (e.g., PSA 5B vs. 7B, gel content: 75 wt %). As G' only relates to the storage energy, it could not fully describe a PSA's resistance to deformation. Creep compliance J(t) should be a better indicator for predicting shear strength, as it considers both G' and G":

$$J(t) = 1/(G'' \times \sqrt{(1 + [\tan]^1 2\delta)}) = 1/\sqrt{(G''^2 + G'^2)} = 1/G^1. \qquad (6)$$

Figure 11:
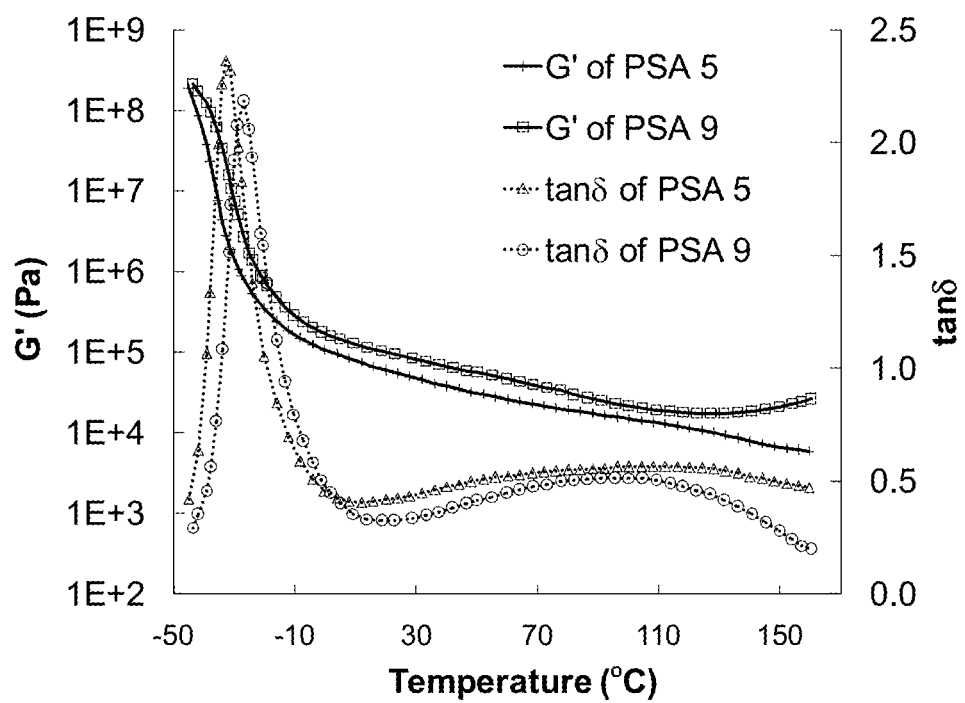
FIG. 11 depicts a graph showing DMA temperature sweep curves of PSA 5 and 9 of Example 2.
Figure 12:
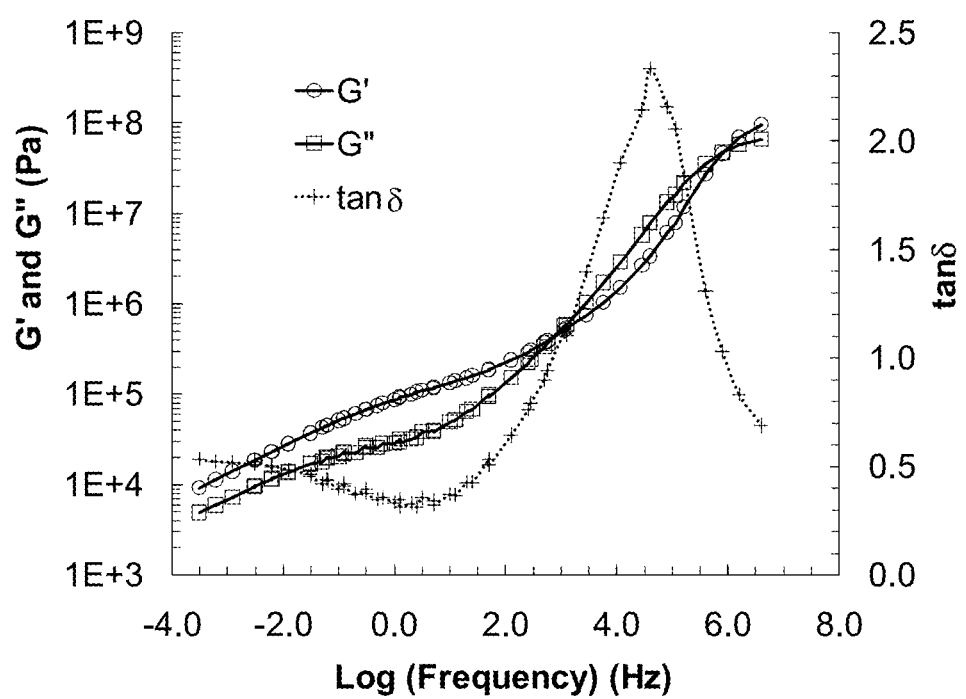
FIG. 12 depicts a graph showing a frequency sweep master curve of PSA 9 of Example 2.

From Eq. 6, one observes that the smaller is J(t), the larger will be the PSA's capability to resist shear force and accordingly, the larger the shear strength measurement. For example, Table 3 shows that at a gel content of 50 wt %, PSA 4B had a much smaller J(t) than 6B and FIG. 6 shows the larger shear strength for PSA 4B. However, at a gel content of 75 wt %, PSA 5B had a very close J(t) to that of 7B, which still could not explain the much larger shear strength of PSA 5B. This suggests that the use of a single frequency may not be the best choice. Thus, the G' and G" between different PSAs were compared over a wide frequency range from the plateau region to the terminal flow region (i.e., 80 to 0.001 Hz). In FIGS. 11 and 12, at similar gel contents, the PSAs with much larger $M_c$ and $M_w$ (e.g., PSA 4B or 5B) yielded a much larger G' and G" in practically the entire region. This was due to the larger number of entanglements possessed by these PSAs produced in the absence of cross-linker. Accordingly, much longer times would be needed to separate the entanglements if a constant shear force was applied and larger shear strengths would result. In addition, the larger shear strength of PSA 3B compared to that of PSA 6B (see FIG. 7), is consistent with its larger J(t) at a single frequency (0.002 Hz) and also larger G' and G" over a broader region (i.e., 80 to 0.001 Hz).

CONCLUSION

Using CTA and cross-linker simultaneously, as opposed to manipulating one concentration at a time, allows one to expand the range of latex microstructural possibilities. At similar gel contents, the latexes produced by varying the amount of CTA in the absence of cross-linker showed significantly larger $M_c$ and $M_w$ as well as a much smaller amount of very small sol polymer (e.g., <$M_e$), compared with their counterparts obtained by using both CTA and cross-linker. The larger $M_c$ and $M_w$ led to improved entanglements between the polymer chains in the corresponding PSAs. Accordingly, these PSAs showed an enhanced capability to resist deformation, as reflected by their much larger modulus (i.e., G' and G") in almost the entire studied frequency range. Consequently, at similar gel content, PSAs with larger $M_e$ and $M_w$ exhibited much larger shear strengths than those with smaller $M_c$ and M. The tack and peel strength of the above mentioned similar gel content PSAs were very close, despite their very different viscoelastic properties. During tack and peel strength tests, the PSAs with larger $M_c$ and $M_w$ could not wet the substrate as well as their similar gel content counterparts with smaller $M_c$ and M, due to their larger elastic moduli at the bonding frequency (G'($\omega_2$)). Meanwhile, they could have experienced much larger strains during the debonding process, due to their improved capability for elongation. This negative effect of less wetting on tack and peel strength counterbalanced by the positive effect of larger strain, therefore resulted in similar tack and peel strength readings. In summary, at similar gel contents, shear strength could be significantly improved at no sacrifice to tack and peel strength by improving the entanglement between polymer chains in the PSAs.

Example 2

$2^{nd}$ Polymerization

Polymerization was carried out essentially as in Example 1 using the formulation shown in Table 4. The feed times of the initiator solution and the monomer emulsion were manipulated to modify the polymer properties as described below in Section 3. After the feeding was completed, the reaction was allowed to proceed for an additional 50 min to increase monomer conversion. The latex was then cooled to below 30° C., HQ was added to stop the polymerization, and ammonia was added to adjust the pH to ~3.5. The amounts of CTA and cross-linker as well as the monomer composition for both the seed and feed steps were varied as described in Section 3.

TABLE 4

Latex polymerization formulations.

| Formulation Component | Initial charge (g) | Feeding (g) Monomer emulsion | Initiator solution |
|---|---|---|---|
| H₂O | 202/15* | 89 | 90 |
| Monomer mixture | 12 | 338.4 | — |
| NDM (CTA) | — | 0-0.2 phm** | — |
| AMA | — | 0-0.4 phm** | — |
| KPS | 0.4 | — | 0.90 |

TABLE 4-continued

Latex polymerization formulations.

| Formulation Component | Initial charge (g) | Feeding (g) Monomer emulsion | Initiator solution |
|---|---|---|---|
| SDS | 0.45 | 6.7 or 4.25*** | — |
| NaHCO₃ | 0.05 | — | — |

*Water used for initiator solution in seed production stage.
**phm = parts per hundred parts monomer, varied as indicated in Table 5.
***4.25 g SDS used only in Run 14; all other runs at 6.7 g SDS.

3. Results and Discussion

3.1. Effect of AMA Cross-Linker

To study the influence of cross-linker, three runs (Runs 1, 2 and 3) were carried out at a BA/MMA weight ratio of 90/10. AMA was used as the cross-linker; and the monomer emulsion and initiator solution feeding times were 3 and 3.5 h, respectively. The AMA concentration, latex properties and PSA performance related to these three runs are shown in Table 5 (note that run number, latex ID and PSA ID have corresponding numbering, i.e., the latex from Run 1 has a latex ID of 1 and the PSA film cast from that latex has a PSA ID of 1).

TABLE 5

Latexes and PSAs related to Run 1-3 (BA/MMA weight ratio: 90/10)

| Latex ID | AMA (phm) | Gel content (wt %) | $M_w$ ($\times 10^{-3}$ g/mol) | $M_n$ ($\times 10^{-3}$ g/mol) |
|---|---|---|---|---|
| 1 | 0 | 64 | 296 | 90 |
| 2 | 0.2 | 91 | 107 | 51 |
| 3 | 0.4 | 96 | — | — |

| PSA ID | Film thickness (nm) | Tack (N/m) | Peel strength (N/m) | Shear strength |
|---|---|---|---|---|
| 1 | 30 | 61 | 47 | 101.6 h |
| 2 | 30 | 30 | 20 | >1 month |
| 3 | 30 | 28 | 15 | >1 month |

The three latexes had similar z-average particle diameters (~150 nm). In addition, the PSD of these latexes was very narrow with PDI=0.04 with no apparent secondary peaks or shoulders at either the low or high particle size ranges. This is consistent with the assumption that neither secondary particle nucleation nor coagulation occurred during the polymerization. All three runs were carried out under monomer-starved conditions with the instantaneous monomer conversion beyond 90 wt % for most of the polymerization process. The solids contents of these three latexes were each ~47 wt %. It was found that an AMA did not significantly affect the polymerization rate.

Table 5 shows that, as in Example 1, an increase in AMA concentration led to an increase in the gel content increased and a decrease in Mw.

All three PSAs showed adhesive (as opposed to cohesive) failure during both tack and peel strength tests. Table 5 shows that with the increase in gel content, tack and peel strength decreased, while shear strength increased. The increase in gel content led to higher cohesive strength and a larger shear strength. At the same time, the resulting lower deformability and flow ability of the PSA weakened the bonding between the PSA and substrate, causing lower tack and peel strength. In all cases in Table 5, the tack and peel strength values of the PSAs were very low.

3.2. Effect of Feeding Time

In order to improve tack and peel strength, the monomer emulsion and initiator feeding times of Run 1 were reduced by 0.5 h each. Thus, Run 4 was identical to Run 1, except for the feeding times. Run 4 was also carried out under monomer-starved condition. All remaining runs were conducted using these shortened feeding times of 2.5 h for the monomer emulsion and 3 h for the initiator solution.

The polymer properties and PSA performance of Run 4 are shown in Table 6. By comparing the data of Run 4 with that of Run 1 (see Table 5), one observes a slight decrease in gel content from 64 to 60 wt %, and a slight increase in Mw from 296,000 to 328,000 g/mol. The particle size and $T_g$ were not significantly affected by the feeding times. The PSD of latex 4 was very narrow with a z-average diameter close to that of latex 1, i.e., ~150 nm. The $T_g$ values obtained via DMA were −27 and −28° C., respectively, for PSAs 1 and 4. It was clear from the DMA results that latex copolymers with homogenous compositions similar to that of the monomer mixture were formed.

TABLE 6

Latexes and PSAs related to Run 4-6 (BA/MMA weight ratio was varied) and Run 14 (BA/MMA for initial charge, and BA/AA/HEMA for feeding)

| Run ID | BA/MMA weight ratio (initial load & feeding) | $T_g$ (° C.) | Gel content (wt %) | $M_w$ (×10$^{-3}$ g/mol) | $M_n$ (×10$^{-3}$ g/mol) |
|---|---|---|---|---|---|
| 4 | 90/10 | −28 | 60 | 328 | 117 |
| 5 | 95/5 | −33/−44[a] | 63 | 315 | 92 |
| 6 | 98/2 | −35 | 64 | 309 | 55 |
| 14 | 95/5 (initial load) 96/2/2[b] (feeding) | −45[a] | 51 | 443 | 105 |

| PSA ID | Film thickness (μm) | Tack (N/m) | Peel strength (N/m) | Shear strength (h) |
|---|---|---|---|---|
| 4 | 30 | 65 | 57 | 73.9 |
| 4 | 60 | 141 | 135 | 31.9 |
| 5 | 33 | 93 | 60 | 22.2 |
| 14 | 33 | 223 | 216 | 41.8 |

[a]$T_g$s obtained via DSC method. Other $T_g$ values were from DMA method. It is known that the DMA method results in a higher $T_g$ than the DSC method.
[b]BA/AA/HEMA weight ratio of 96/2/2. Other weight ratios were for BA/MMA mixture.

Table 7 shows the change in latex polymer properties during the polymerization process for Run 4. As the polymerization progressed, the gel content increased only slightly and the Mw decreased slightly. This further confirms that the polymerization was carried out under monomer-starved conditions with no secondary nucleation.

TABLE 7

Polymer properties of latex samples taken during Run 4

| Latex sample ID | Feeding time (min) | Gel content (wt %) | $M_w$ (×10$^{-3}$ g/mol) | $M_n$ (×10$^{-3}$ g/mol) |
|---|---|---|---|---|
| 1# | 20 | 53 | 401 | 120 |
| 2# | 50 | 57 | 351 | 99 |
| 3# | 150 | 60 | 325 | 102 |
| 4# (Final latex) | — | 60 | 328 | 117 |

By comparing the performance of PSA 4 (Table 6) and PSA 1 (Table 5), one can see that at the same film thickness of 30 μm, PSA 4 had slightly higher tack and peel strength, but significantly lower shear strength compared with PSA 1. The significant decrease in shear strength from 101.6 h to 73.9 h was caused by not only the slightly lower gel content (60 wt % for PSA 4 and 64 wt % for PSA 1), but possibly due to the looser gel network. Previous researches have shown that when BA was polymerized via a starved seeded semi-batch emulsion polymerization process, decreasing the monomer feeding rate did not greatly affect gel content, but did significantly enhance intra-molecular polymer chain transfer and accordingly led to higher branching levels. Since it is well known that termination by combination between these branched polymer radicals leads to gel polymer, the cross-linking density should also increase with a decrease in monomer feeding rate.

Despite the slight improvements in tack and peel strength for PSA 4 compared to that of PSA 1, the results were still low. Thus, given the known influence of film thickness on PSA performance, PSA 4 was recast with a film thickness of 60 μm. Table 6, shows that the increase in film thickness led to increases in tack and peel strength, but a significant decrease in the shear strength. All future PSA films were cast at a thickness of 60 μm, unless otherwise mentioned.

3.3 Influence of BA/MMA Weight Ratio

Since the tack and peel strength were not significantly improved by shortening the monomer feeding rate, the BA/MMA monomer weight ratio was manipulated to achieve this goal. Considering that the $T_g$ of poly(butyl acrylate) (PBA, −45° C.) is much lower than that of poly(methyl methacrylate) (PMMA, 105° C.), the BA/MMA weight ratio was adjusted to 95/5 and 98/2 for Runs 5 and 6, respectively. The polymerization conditions of these two runs were otherwise exactly the same as for Run 4.

The PSDs of latexes 5 and 6 were very narrow and did not show evidence of secondary nucleation or coagulation. The particle diameters of latexes 5 and 6 were similar to that of latex 4. The instantaneous monomer conversions for Runs 5 and 6 were monitored and no significant differences from that of Run 4 were detected although it is well known that the polymerization reactivity ratio of MMA is almost 5 times of that of BA ($r_{BA}$=0.507 and $r_{MMA}$=2.375). This is due to the fact that the BA/MMA weight ratio was changed only slightly and that monomer-starved conditions were used. In this case, polymerization rate was mainly controlled by the monomer feeding rate.

The polymer properties of the latexes form these three runs are shown in Table 6. As expected, increasing the amount of BA led to decreased $T_g$ and slightly increased gel contents. The latter was likely due to increased backbiting related to the higher BA concentrations.

Figure 8:
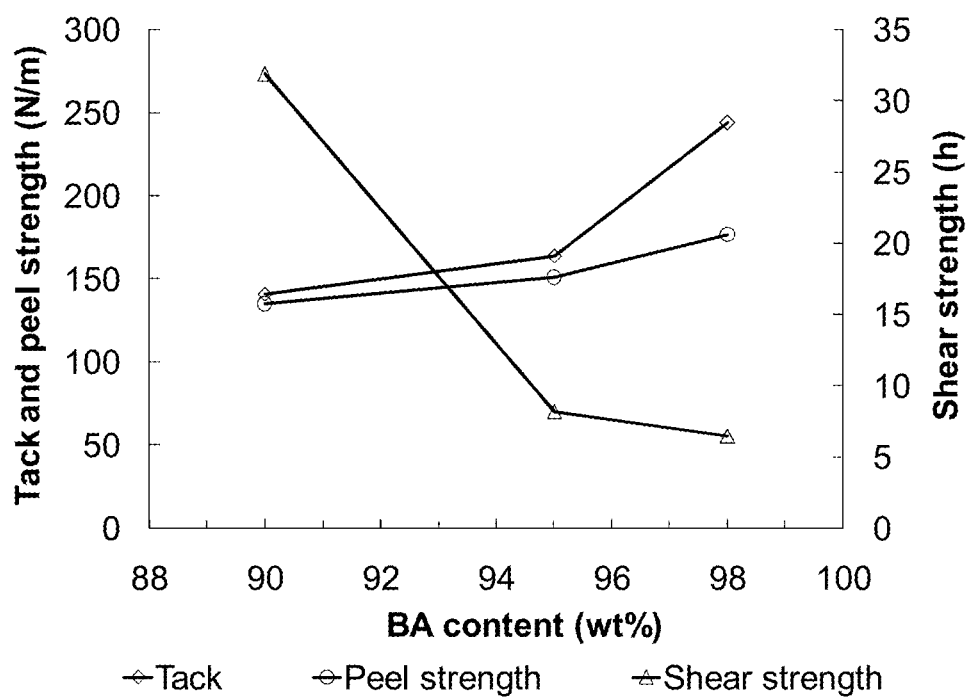
FIG. 8 is a bar graph showing the adhesive performance of PSA film 4, 5 and 6 of Example 2. (PSA film thickness: 60 μm)
Figure 9:
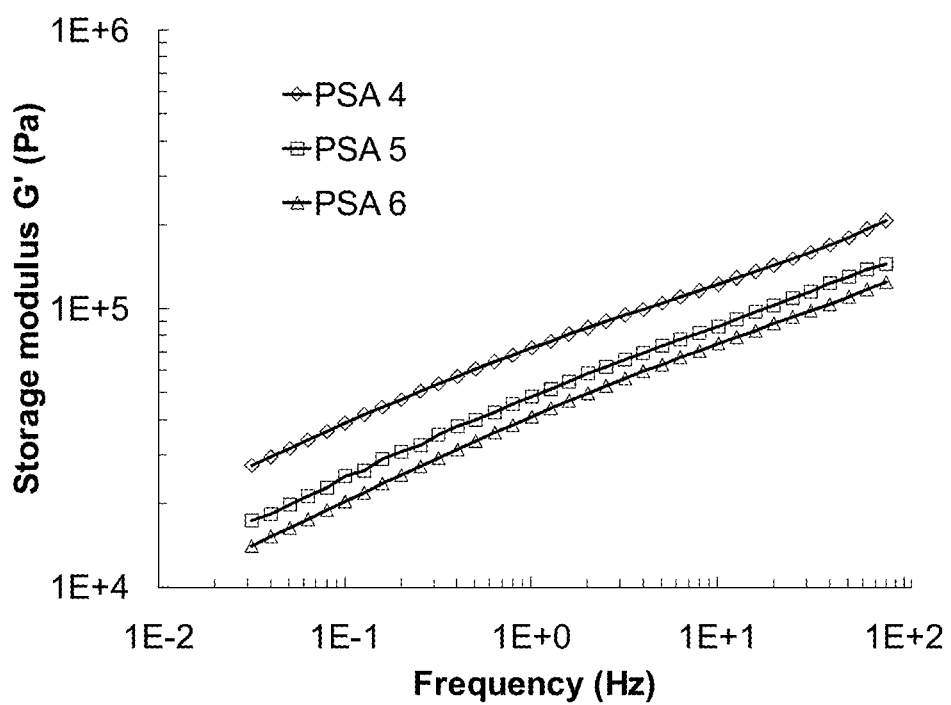
FIG. 9 is a graph of storage modulus (G') vs. frequency at 23° C. for PSA 4, 5 and 6 of Example 2.
Figure 10:
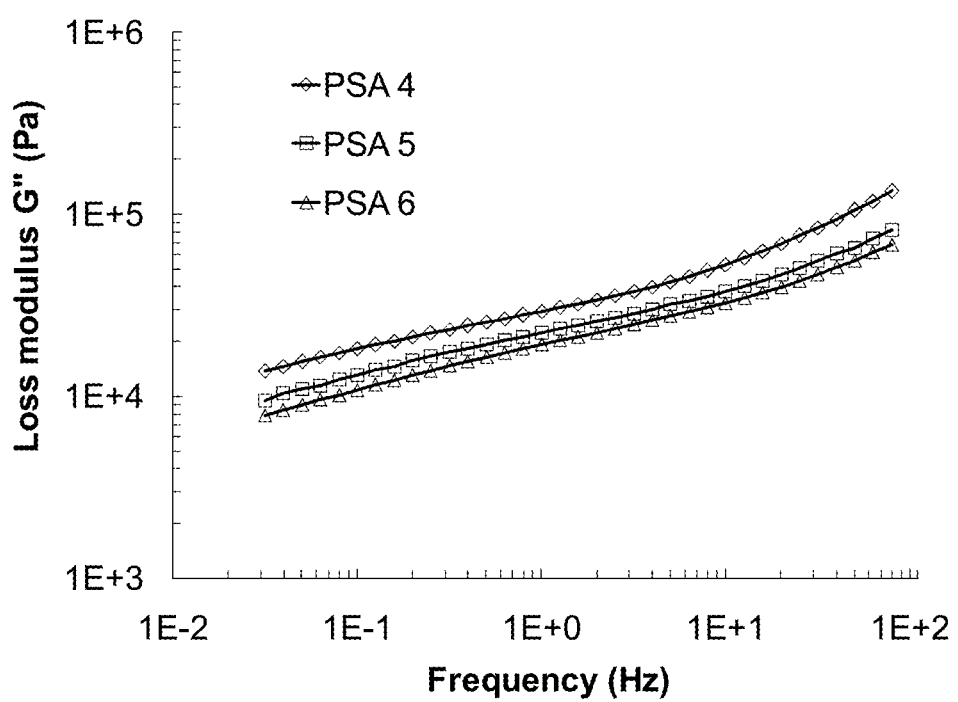
FIG. 10 is a graph of the loss modulus (G") vs. frequency at 23° C. for PSA 4, 5 and 6 of Example 2.

The performance of PSA films 4, 5 and 6 is shown in FIG. 8. Increasing the BA concentration led to increases in tack and peel strength and a significant decrease in shear strength. The decrease in shear strength may be due to the lower cohesive strength of the PSA related to its lower $T_g$. To explain the change in peel strength with the increase in BA content, the viscoelastic properties of the three PSAs were measured. FIGS. 9 and 10 show the storage and loss moduli, respectively, obtained via frequency sweeps at 23° C. for the three PSAs. One can observe that the storage modulus curves of PSAs 4, 5 and 6 (see FIG. 9) were nearly parallel to each other as were the loss modulus curves (see FIG. 10). This similarity in viscoelastic properties was likely caused by the similar polymer microstructures of these PSAs. As mentioned earlier, these PSAs had similar gel contents and $M_w$. Furthermore, it is likely that the $M_c$ (molecular weight between the cross-linking points) were also similar, considering the minor composition differences between these three PSAs. Thus, similar polymer microstructures enabled the PSAs to store (G') and dissipate (G'') energy similarly under the same dynamic force and the ratios of stored energy to dissipated energy were similar. In addition, FIGS. 9 and 10 show that the values of the modulus decreased with the increase of the amount of BA in the copolymer; this was due to the lower $T_g$.

Yang et al. reported that peel strength is proportional to the ratio of the loss modulus at debonding frequency (G'' ($\omega_1$)) to the storage modulus at bonding frequency (G' ($\omega_2$)) as shown in Equation 1. To get the exact values of the ratios, the debonding frequencies ($\phi_1$) were calculated with equation 2 reported by Tse [45]. The test conditions used in Tse's work were identical to ours except for the film thickness. Tse used a film thickness of 37 μm, and they reported a debonding frequency, $\omega_1$, of 435 rad/s (or 69.3 Hz). In our case, the film thickness was 60 μm, so we corrected $\omega_1$ for our peel strength test as shown in Equation 3. Similarly, bonding frequency, $\omega_2$, was corrected for film thickness as shown in Equation 5. For $\omega_2$, a value of 1 rad/s (or 0.16 Hz) for a standard peel test was used.

$$P \propto 1 \times G''(\omega_1 1)/G'(\omega_2 2) \tag{1}$$

$$\omega_1 = \frac{2\pi(\text{bonding rupture speed})}{(\text{adhesive thickness})} \frac{\text{rad}}{\text{s}} \tag{2}$$

$$\omega_1 = 43 \text{ s}\frac{\text{rad}}{\text{s}} \times \frac{37 \text{ nm}}{60 \text{ nm}} \times 0.1592 \frac{\text{Hz}}{\left(\frac{\text{rad}}{\text{s}}\right)} = 42.7 \text{ Hz} \tag{3}$$

$$\omega_2 = 1\frac{\text{rad}}{\text{s}} \times \frac{37 \text{ nm}}{60 \text{ nm}} \times 0.1592 \frac{\text{Hz}}{\left(\frac{\text{rad}}{\text{s}}\right)} = 0.0982 \text{ Hz} \tag{4}$$

At bonding and debonding frequencies obtained above, the G''($\omega_1$) values for PSA 4, 5 and 6 were 96918, 61849, and 52207 Pa, respectively, the G'($\omega_2$) values were 38436, 24723, and 20083 Pa, respectively, and the G''($\omega_1$)/G'($\omega_2$) ratios were 2.52, 2.50 and 2.59, respectively. As the BA/MMA weight ratio changed from 90/10 to 95/5, the G''($\omega_1$)/G'($\omega_2$) values remained nearly constant, which is in agreement with the similar peel strength values of PSA 4 compared PSA 5. Further changes in the BA/MMA weight ratio to 98/2 resulted in a slight increase in the G''($\omega_1$)/G'($\omega_2$) ratio from 2.50 to 2.59, which corresponds to a slight increase in peel strength of PSA 6 compared to that of PSA 5.

Lowering the $T_g$, from PSA 4 to PSA 6 resulted in improved deformability and flow ability of the PSA. From FIG. 8, we observe that the resulting changes in tack differ in magnitude from that in peel strength, with tack exhibiting larger changes. It is well known that tack and peel strength tests consist of both bonding and debonding processes. In addition, the bonding process of the tack test features a much shorter contact time and lower force compared to the peel strength test. Therefore, the deformability and flow ability of the PSA should have a larger influence on tack than on peel strength, as observed in FIG. 8.

3.4 Influence of HEMA in the Absence of CTA and Cross-Linker

To study the influence of HEMA, three additional runs (Runs 7, 8 and 9) were carried out by adding HEMA to the recipe for Run 5. These three new runs had the same seed composition as in Run 5 but differed in the fed monomer emulsion mixtures with BA/MMA/HEMA weight ratios of 95/5/0, 95/5/1, 95/5/2 and 95/5/4, for Runs 5, 7, 8 and 9, respectively.

The PSDs of latexes 7, 8 and 9 were all very narrow, and did not present evidence of any secondary nucleation or coagulation; this was despite the hydrophilic nature of HEMA. The z-average particle diameters of latexes 5, 7, 8 and 9 are shown in Table 8. The particle diameter was independent of the amount of HEMA in the monomer emulsion feed.

TABLE 8

Polymerization conditions and latex polymer properties for Run 5, 7-9 (No NDM; BA/MMA/HEMA weight ratio was varied)

| | Latex ID | | | |
|---|---|---|---|---|
| | 5 | 7 | 8 | 9 |
| BA/MMA/HEMA weight ratio | | | | |
| Initial load | 95/5/0 | 95/5/0 | 95/5/0 | 95/5/0 |
| Monomer emulsion feeding | 95/5/0 | 95/5/1 | 95/5/2 | 95/5/4 |
| z-Ave. particle diameter (nm) | 151 | 147 | 145 | 150 |
| $T_g$ (° C.) | −33 | −31 | −30 | −27 |
| Gel content (wt %) | 63 | 64 | 67 | 81 |
| $M_w$ (×10$^{-3}$ g/mol) | 315 | 203 | 190 | 117 |
| $M_n$ (×10$^{-3}$ g/mol) | 92 | 36 | 32 | 46 |

The monomer conversions for Runs 7, 8 and 9, were monitored throughout the feed process (i.e., at feed times of 50, 100, 150 and 180 min) in addition to the end of the polymerization. Both the instantaneous and overall monomer conversions were calculated using the gravimetric method reported previously [2] and compared to those of Run 5. The results showed that the monomer conversions did not significantly change with the change of HEMA concentration in the monomer mixture.

The insignificant influence of HEMA on the polymerization rate is due to the small amounts of HEMA added to the monomer mixture as well as the monomer-starved conditions used. The final monomer conversions for these four runs were all at or beyond 99.5%, and one can assume that the added HEMA for all these runs was fully polymerized given the higher reactivity ratio of HEMA compared to that of BA ($r_{HEMA}$=4.497 and $r_{t-BA}$=0.212) and MMA ($r_{HEMA}$=0.98 and $r_{MMA}$=0.82). (Note: Considering the structural similarity of n-BA (abbreviated as BA) to t-BA (tert-butyl acrylate), it is reasonable to assume that they have similar polymerization reactivities.)

It is of interest to know the distribution of HEMA in the latexes. This was accomplished using a temperature sweep in the DMA (dynamic mechanical analysis) for PSAs 5, 7, 8 and 9. The storage modulus (G') and tan δ curves of PSA 5 and 9 are shown in FIG. 11 as examples. PSA 5 (BA/MMA/HEMA weight ratio: 95/5/0) exhibited only one tan δ peak at −33° C. while PSA 9 (BA/MMA/HEMA ratio: 95/5/4) gave two tan δ peaks; one at −27° C. and a second, smaller one over a very broad temperature range (50 to 160° C.). If homogenous copolymer was formed, the tan δ curve should exhibit only one peak at a low temperature)(~−30°). We suspect that the broader peak for PSA 9 was due to the presence of a small amount of carboxyl groups which were formed during polymerization by the oxidation of OH groups by the persulfate from the initiator. Thus, during the temperature sweep, it is likely that the carboxyl groups reacted with the OH groups at high temperature (>120° C.), in essence slightly increasing the gel content and therefore the G' value. This would result in the broad tan δ peak.

To avoid this phenomenon, we proceeded with a series of frequency sweep measurements using the DMA, with the highest temperature of 80° C. With these measurements, a frequency sweep master curve was built for PSA 9 as shown in FIG. 12, Only one tan δ peak is evident in that figure which confirms that HEMA was randomly distributed in the copolymer of PSA 9.

It is clear from the discussion above that the tan δ peak at the low temperature range of the temperature sweep curve represents the actual single $T_g$ of the BA/MMA/HEMA copolymer. The $T_g$ values listed in Table 8 for PSA 5, 7, 8 and 9, show an increase with HEMA content. This is consistent with the fact that the $T_g$ of poly(HEMA) is 87° C., while that of BA/MMA polymer (weight ratio: 95/5) was −33° C. as shown in Table 8 for PSA 5.

Table 8 reports that an increase in HEMA resulted in an increase in gel content. As the polymerization rate was not significantly affected by adding HEMA, the possible reasons for the increase in gel content include: (1) With the increase in the amount of HEMA, the amount of MMA was decreased. As MMA does not have labile tertiary hydrogens like BA and HEMA, chain transfer to polymer was enhanced with the increase of HEMA, and consequently gel content increased. (2) The HEMA used in this study contained ~3 wt % of diethylene glycol monomethacrylate (DEGM), which has two double bonds and is a side product arising from HEMA production. To estimate the influence of this impurity in HEMA on the gel content, gel content vs. cross-linker concentration trend line was constructed with the data related to latexes 1, 2 and 3 shown in Table 5. The corresponding runs had longer feeding times compared to Runs 4, 7, 8 and 9. Considering the minor influence of shortening feeding times on gel content discussed earlier, the trend line could still be useful for predicting the gel content of HEMA-containing latexes.

Figure 13:
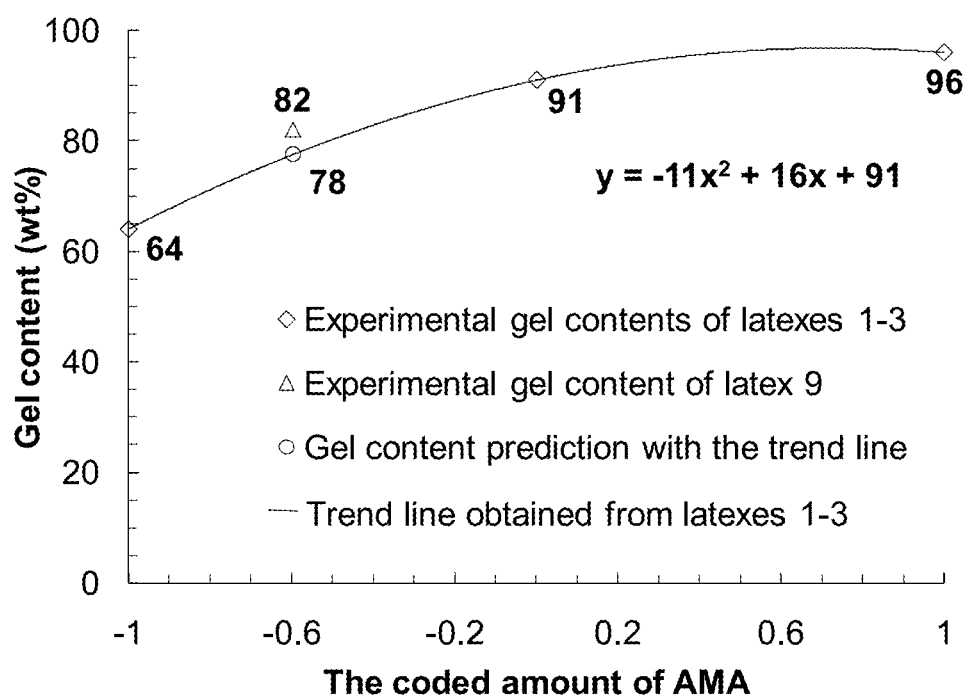
FIG. 13 is a graph showing the gel content prediction for latex 9 of Example 2.

The trend line shown in FIG. 13 has the coded values of the cross-linker AMA as the x axis. The coded values were obtained with equation 5. In the equation, $x^x$ is the coded amount of cross-linker while X is the actual amount in phm. Hereafter, we will use latex 9 as an example, and use the trend line to predict its gel content. As Run 9 had the impurity DEGM as a possible cross-linker, in order to use the trend line, we converted the amount of DEGM to the equivalent amount of AMA using Equation 6.

$$x = \frac{(X - 0.2 \text{ phm})}{0.2 \text{ phm}} \quad (5)$$

$$x_{AMA} = x_{DEGM} \times \frac{M_{AMA}\left(\frac{g}{mol}\right)}{M_{DEGM}\left(\frac{g}{mol}\right)} = x_{DEGM} \times \frac{126}{187} = 0.674 x_{DEGM} \quad (6)$$

where $x_{AMA}$ and $x_{DEGM}$ are the coded amounts of AMA and DEGM. $M_{AMA}$ and $M_{DEGM}$ are the molecular weights of AMA and DEGM, respectively.

Seeing that there was ~4 wt % of HEMA in Run 9 and there was ~3 wt % of DEGM in the HEMA monomer, one can assume that there was ~0.12 phm DEGM in the monomer mixture. Using Equation 6, this amount of DEGM was implied ~0.081 phm AMA. Using the trend line, a predicted gel content of ~78 wt % for latex 9 was calculated, as shown in FIG. 13. This predicted value is very close to the gel content value obtained from the experiments (~82 wt %) as shown in FIG. 13. Thus, the gel content increase caused by increasing the amount of HEMA can be attributed mainly to the presence of DEGM impurity in HEMA.

3.5 Effect of HEMA when 0.2 phm NDM (CTA) was Added

To further confirm the influence of HEMA on polymerization kinetics and latex polymer properties, Runs 10, 11, 12 and 13 were conducted. These runs corresponded to Runs 5, 7, 8 and 9, respectively, in terms of their recipes except that the new runs contained 0.2 phm NDM. The polymerization conditions and the latex polymer properties are shown in Table 9 for these runs.

TABLE 9

Polymerization conditions and latex polymer properties for Run 10-13 (0.2 phm NDM; BA/MMA/HEMA weight ratio was varied)

| | Latex ID | | | |
|---|---|---|---|---|
| | 10 | 11 | 12 | 13 |
| BA/MMA/HEMA weight ratio | | | | |
| Initial load | 95/5/0 | 95/5/0 | 95/5/0 | 95/5/0 |
| Monomer emulsion feeding | 95/5/0 | 95/5/1 | 95/5/2 | 95/5/4 |
| z-Ave. particle diameter (nm) | 149 | 146 | 147 | 151 |
| $T_g$ (° C.) | −33 | −32 | −31 | −28 |
| Gel content (wt %) | 0 | 2 | 5 | 21 |
| $M_w$ (×10$^{-3}$ g/mol) | 223 | 264 | 234 | 189 |
| $M_n$ (×10$^{-3}$ g/mol) | 43 | 31 | 38 | 32 |

For Runs 10-13, the instantaneous monomer conversion and the effect of HEMA provided no different observations from runs 5, 7, 8 and 9.

3.6 Effect of HEMA on PSA Performance

Latexes 5, and 7-13 were cast as PSA films with thickness ~60 μm. Their performance as PSAs is shown in FIGS. 14 and 15.

Figure 14:
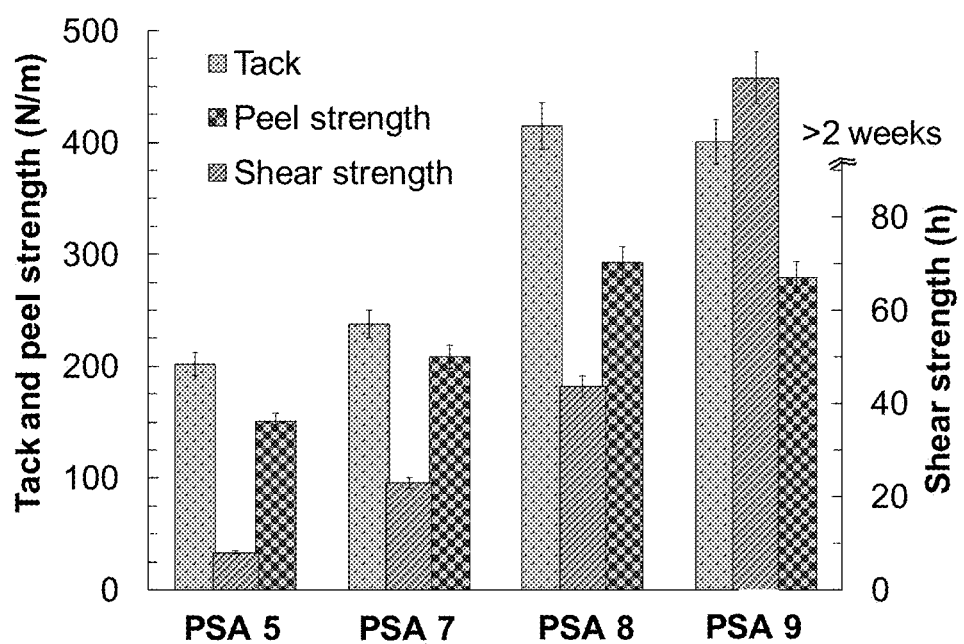
FIG. 14 is a graph showing the adhesive performance of PSA film 5, 7, 8 and 9 of Example 2 with respect to tack, peel strength and shear strength. (PSA film thickness: 60 μm)
Figure 15:
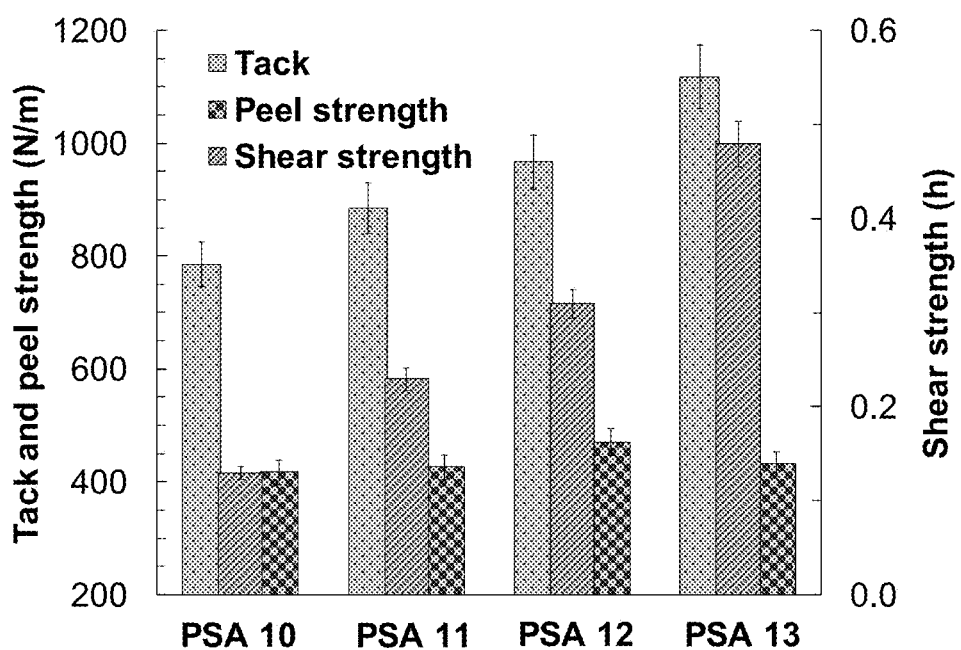
FIG. 15 is a graph showing the adhesive performance of PSA film 10, 11, 12 and 13 of Example 2 with respect to tack, peel strength and shear strength. (PSA film thickness: 60 μm)

To facilitate the discussion, hereafter we refer to the PSAs in FIG. 14 as "high gel content PSAs" and that in FIG. 15 are referred to as "low gel content PSAs". The high gel content PSAs all showed adhesive failure during tack and peel strength tests, while the low gel content PSAs all showed cohesive failure during these tests.

FIG. 14 shows that for the high gel content PSAs, the shear strength increased with HEMA content. Presumably the higher shear strength results from the added HEMA which raises the acrylic copolymer $T_g$s, and results in higher gel contents, as well as stronger hydrogen bonds between the copolymer chains. The same trend for the influence of HEMA on shear strength is shown in FIG. 15 for the low gel content PSAs. FIG. 14 also shows that for the high gel content PSAs, tack first increased and then decreased with the increase of HEMA from 0 to ~4 phm, and the maximum was at ~2 phm HEMA. The same trend for the influence of HEMA on peel strength was observed.

Figure 16:
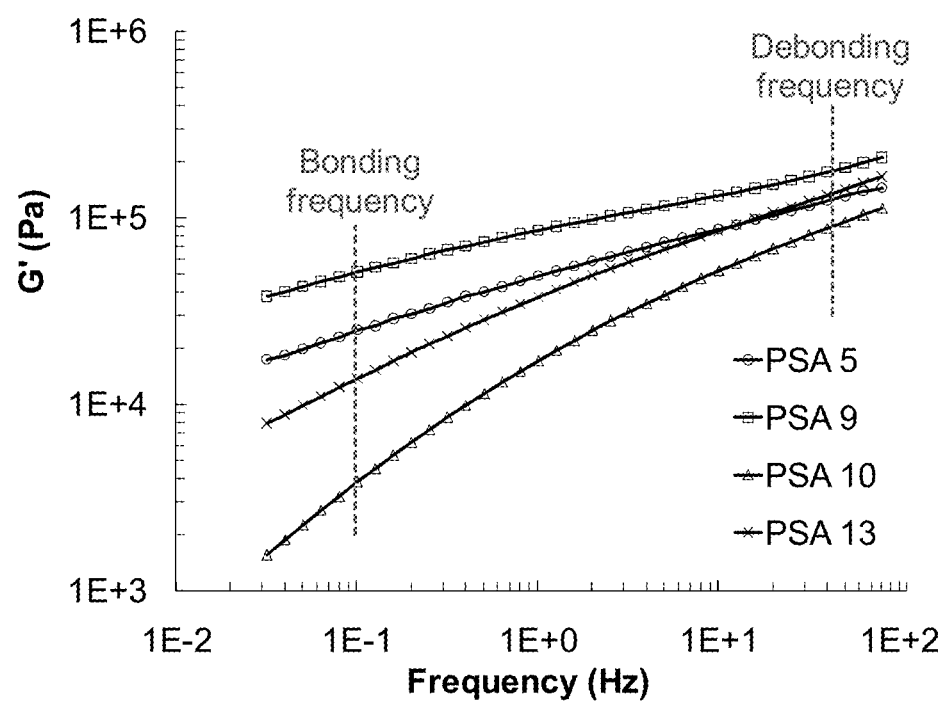
FIG. 16 is a graph showing the storage modulus of high gel content (PSA 5 and 9) and low gel content (PSA 10 and 13) PSAs of Example 2. (Bonding and debonding frequency corresponds to PSA film thickness of 60 μm)
Figure 17:
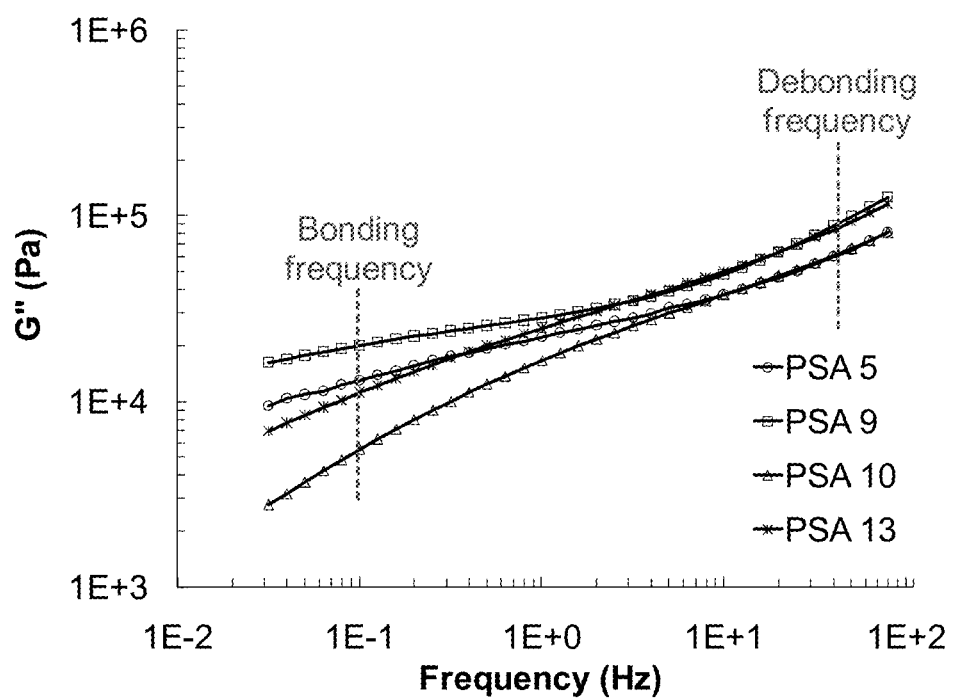
FIG. 17 is a graph showing the loss modulus of high gel content (PSA 5 and 9) and low gel content (PSA 10 and 13) PSAs of Example 2. (Bonding and debonding frequency corresponds to PSA film thickness of 60 μm)

Further insight into these tack and peel strength changes were obtained from the viscoelastic properties of these PSAs via frequency sweep tests at 23° C. using DMA (see examples using PSA 5 and PSA 9 in FIGS. 16-17). In FIG. 16, we observe that the storage modulus (G') increased with HEMA concentration. This was due to the stronger hydrogen bond, higher $T_g$, as well as the higher gel content related to the presence of HEMA. In addition, the shape of the G' curves stayed almost unchanged. The same behaviour was observed for the loss modulus (G") in FIG. 17. Given the similarity in shape of the G' and G" curves for these PSAs, it is likely that these PSAs had very similar $G''(\omega_1)/G'(\omega_2)$ values. $G''(\omega_1=42.7\,Hz)/G'(\omega_2=0.0982\,Hz)$ values of 2.50, 2.28, 2.19 and 1.80, were obtained for PSA 5, 7, 8 and 9, respectively. Thus, only a slight decrease in the G"/G' ratio with increasing HEMA content was noted.

It is well known that peel strength decreases with the decrease in $G''(\omega_1)/G'(\omega_2)$, but at the same time it can be increased by improving the work of adhesion (a.ka. surface interaction energy) between the PSA and the substrate. Based on this knowledge and the observed slight decrease in $G''(\omega_1)/G'(\omega_2)$ with the increase in HEMA concentration, we hypothesize that the reason for the increase in peel strength when HEMA was increased from 0 to 2 phm was that the work of adhesion between the PSA and the testing panel was increased.

As HEMA contains polar hydroxyl groups and also some of the hydroxyl groups were likely oxidized by the initiator to polar carboxyl groups, by introducing more HEMA to the PSA, the work of adhesion was enhanced. Consequently, higher peel strength was observed when 0-2 phm HEMA was added while the $G''(\omega_1)/G'(\omega_2)$ did not change much. As for the more or less constant peel strength when HEMA was increased from about 2 phm to about 4 phm, the reason might be that the positive effect on the peel strength caused by improving the work of adhesion could no longer counterbalance the negative effect caused by the decrease in $G''(\omega_1)/G'(\omega_2)$. Taking into account that the change in tack with the increase of HEMA is very similar to that in peel strength as mentioned earlier, it is reasonable to hypothesize that the above explanation for the change in peel strength should also apply to the change in tack.

FIG. 15 shows that for the low gel content BA/MMA/HEMA PSAs, tack increased with HEMA concentration; however, the peel strength remained more or less constant. This trend differs from what was observed for the high gel content PSAs. We therefore referred to the viscoelastic properties for these low gel content BA/MMA/HEMA PSAs via frequency sweeps at 23° C. using DMA. The G' and G" curves of PSAs 10 and 13 are shown in FIGS. 16 and 17 as examples. It was found that the change in G' curves with the increase in HEMA content for the low gel content PSAs was very different from that for the high gel content PSAs.

These low gel content PSAs showed a much steeper increase in G' in the lower frequency range (near or below the bonding frequency) than in the higher frequency range (near or above the debonding frequency), with the increase in HEMA content (see, for example, Table 10). Consequently, the shape of the G' curves of these low gel content PSAs were no longer similar. The same changes in the G" curves for the low gel content PSAs were observed.

TABLE 10

G' and G" changes by adding ~4 phm HEMA

| Modulus ratio | High debonding Frequency (42.7 Hz) | Low bonding Frequency (0.1 Hz) |
|---|---|---|
| High gel content PSAs (5 & 9) | | |
| $G'_{PSA9}/G'_{PSA5}$ | 1.42 | 2.03 |
| $G''_{PSA9}/G''_{PSA5}$ | 1.47 | 1.55 |
| Low gel content PSAs (10 & 13) | | |
| $G'_{PSA13}/G'_{PSA10}$ | 1.50 | 3.60 |
| $G''_{PSA13}/G''_{PSA10}$ | 1.40 | 2.00 |

The differences in behaviour between the low and high gel content PSAs can be explained as follows: (1) the debonding frequency lies in the transition region. This is also the case for our PSAs. For example, one can confirm this by referring to the frequency sweep master curve of PSA 9 (see FIG. 12). Therefore, the polymer chains in both the high and low gel content PSAs were still in a somewhat densely packed state at frequencies beyond or near the debonding frequency (~42.7 Hz). In contrast, the bonding frequency usually occurs at the plateau region for standard tack and peel strength tests. Under our PSA testing conditions, the bonding frequency was found to be around the beginning of the viscous flow region. Hence, at frequencies below or near the bonding frequency, the packing states of the polymer chains in high and low gel content PSAs were different. For the low gel content PSAs, the free volume between the polymer chains was much larger; however, the polymer chains in the high gel content PSAs could not separate as much due to the existence of the gel network. (2) By adding HEMA to the PSA copolymer, the G' and G" were increased (compare 5 to 9, and 10 to 13 in FIGS. 16 and 17, respectively) due to a higher $T_g$. The increased $T_g$ led to a shift of the transition zone to a slightly lower frequency range according to the time-temperature superposition principle. Consequently, at the same debonding frequency, which lies in the transition zone as mentioned earlier, the PSA with the larger amount of HEMA showed higher G' and G" values (compare PSAs 9 to 5 and 13 to 10, respectively). This was also the case for the frequencies still in the transition zone but greater than the debonding frequency (see FIGS. 16 and 17).

The modulus change by adding HEMA can also be explained by referring to the packing state of the polymer chains. Adding HEMA might be able to make the PSA polymer chains stay closer, due to the interaction between the hydroxyl groups and formation of hydrogen bonds. In addition, the effect of adding HEMA should be more significant for the loosely packed state of polymer chains than the densely packed, as in the latter, the polymer chains are already very close to each other. Since the polymer chains of the high gel content PSAs were in a somewhat densely packed state at both the high and low frequency ranges due to the existence of gel, the contribution of HEMA to polymer chain packing should be similar in both ranges. Consequently, nearly parallel modulus curves were obtained for these PSAs (e.g., PSA 5 and 9 in FIGS. 16 and 17). As for the low gel content PSAs, the contribution of HEMA to chain packing should be significantly larger in the low frequency range considering the loosely packed state of the polymer chains at lower frequencies and the somewhat densely packed state at higher frequencies. As a result, the modulus difference was significantly larger in the low frequency range, and therefore the modulus curves did not remain parallel (e.g., PSA 10 and 13 as shown in FIGS. 16 and 17). The influence of the polymer chain packing state on the modulus can be further confirmed as follows: From FIGS. 16 and 17, one can see that at the high frequency range, the modulus of PSA 5 (BA/MMA/HEMA weight ratio: 95/5/0; gel content: ~60 wt. %; $T_g$: −33° C.) was smaller than that of PSA 13 (BA/MMA/HEMA:95/5/4; gel content: ~20%; $T_g$: −28° C.). This was because at the high frequency range, the polymer chains of both PSAs were in a somewhat densely packed state, so the influence of gel content on polymer chain packing was not significant. Instead, HEMA played a bigger role on affecting the modulus, since it increased the $T_g$. In contrast, we can see that in the low frequency range, the modulus of PSA 5 was higher than that of PSA 13. This was because in this frequency range, the polymer chains in PSA 13 were much more loosely packed compared to those in PSA 5 due to its significantly lower gel content. In this case, gel content had a much more significant influence on the modulus than the $T_g$, which is related to the HEMA content. For the low gel content PSAs, the significant difference in shape of the modulus curves between the PSAs result in very different $G''(\omega_1=42.7 \text{ Hz})/G'(\omega_2=0.0982 \text{ Hz})$ ratios: 16.70, 11.52, 6.42 and 5.80, respectively, for PSA 10, 11, 12 and 13. A significant decrease in the ratios with increasing HEMA content is evident.

As the frequency sweep tests were carried out with a strain of about 1%, the obtained viscoelastic properties represent the linear region of the PSA deformation. However, as the low gel content PSAs all showed cohesive failure during the tack and peel strength tests, the tack and peel strength of these PSAs should be correlated with the viscoelastic properties from the non-linear region, where larger strains were involved. It is known that the viscoelastic properties measured in these two regions are different. In addition, these PSAs might have experienced different strains during the tack and peel tests. However, since we did not have the actual strain exhibited by the PSAs during the tack and peel strength tests, we did not carry out frequency tests for the non-linear region. In any case, results from the linear region allow us to conclude that decreases in the $G''(\omega_1)/G'(\omega_2)$ ratio with increasing HEMA content were much larger for the low gel content PSAs compared to their high gel counterparts. Therefore, the expected increase in peel strength caused by the increased work of adhesion between the PSA and the testing panel due to the additional amounts of HEMA were roughly balanced by the negative effect on peel strength caused by the decrease in $G''(\omega_1)/G'(\omega_2)$. Thus, the peel strengths of these low gel content PSAs were similar.

The increase in tack with HEMA content for the low gel content PSAs might be due to the improved work of adhesion caused by the presence of HEMA. The slight decrease in tack (at ~4 phm HEMA) observed for the high gel content PSAs was not evident in this case due to the much better deformability of the low gel content PSAs compared with those of the high gel content ones. In addition, by comparing FIGS. 15 and 9, we can see that for both the low gel content BA/MMA/HEMA PSAs (PSA 10, 11, 12 and 13) and the PSAs with various BA/MMA weight ratios (PSA 3, 4 and 5), the increase in tack was more significant than that in the peel strength. This phenomenon was explained earlier for PSAs 3, 4, and 5. The same explanation should be applied here for the low gel content BA/MMA/HEMA PSAs. However, in this case, better bonding between the PSA and the testing panel was caused by introducing polar hydroxyl and carboxyl groups in the PSAs; while in the former case it was due to better deformation and flow ability of the PSA.

3.7 Effect of HEMA on Latex Viscosity and Emulsifier Migration During PSA Film Formation While filtering the latexes, it was observed that it took a much longer time to filter latexes containing more HEMA. This implies that the viscosity of the latex increased with HEMA content. The reason might be that at high solid contents such as 47%, the latex particles with average particle diameter around 150 nm are densely packed, so that the polar hydroxyl groups on the particle surface can interact with each other, and therefore increase viscosity.

While not wishing to be bound by theory, it is well known that ionic emulsifier (e.g., SDS) can migrate from the bulk latex to the surface during the PSA film drying process. Therefore, increasing viscosity by adding HEMA might decrease the emulsifier migration. Considering the negative influence of emulsifier on the work of adhesion, and accordingly, on tack and peel strength, the PSA performance might also be improved by adding HEMA.

3.8 Effect of Addition of AA and HEMA Plus Reduction of Emulsifier Concentration We have noted above that the addition of HEMA led to a simultaneous increase in tack, peel strength and shear strength for high gel content PSAs. This was due to improvements to the PSAs' surface properties and increases in their cohesive strength. To confirm this idea, and also to produce PSAs with even better performance, we manipulated the PSA bulk and surface properties by adding both AA and HEMA in the monomer mixture and at the same time, greatly decreasing the emulsifier concentration.

The experiment, run 14, was identical to run 5 except for the monomer emulsion feed composition of BA/AA/HEMA (weight ratio: 96/2/2), SDS (4.25 g) and NDM (0.05 phm) (see Table 4 and 6) concentrations. The addition of NDM was done to produce a latex with a similar gel content to that of latex 5, in anticipation of the influence of adding AA and HEMA (as discussed earlier) to the BA/MMA monomer mixture. Table 6 shows that latex 14 had a similar $T_g$ (−45° C.), slightly lower gel content (51 wt %), and higher $M_w$ (443 kg/mol), compared to those of latex 5 (−44° C., 63 wt %, and 315 kg/mol, respectively).

The adhesive performance of PSA 14 was compared to PSA 5; both films were cast with a film thickness of ~33 μm. The tack, peel strength and shear strength of PSA 14 were all significantly larger than those of PSA 5 (see Table 6, i.e., 223 vs. 93 N/m for tack, 216 vs. 60 N/m for peel strength, and 41.8 vs. 22.2 for shear strength). The increase in peel strength was much bigger (i.e., 3.6 times) than that resulting from the addition of HEMA alone (see FIG. 14, i.e. 1.9 times by comparing PSA 8 with PSA5). (Note: In FIG. 14, the PSA performance was obtained at a film thickness of 60 instead of 33 μm). Furthermore, PSA 14 showed similar adhesive performance at a smaller film thickness of 33 μm compared to PSA 8 at a film thickness of 60 μm (i.e., 216 vs. 293 N/m for peel strength and 41.8 vs. 43.7 h for shear strength).

Figure 18:
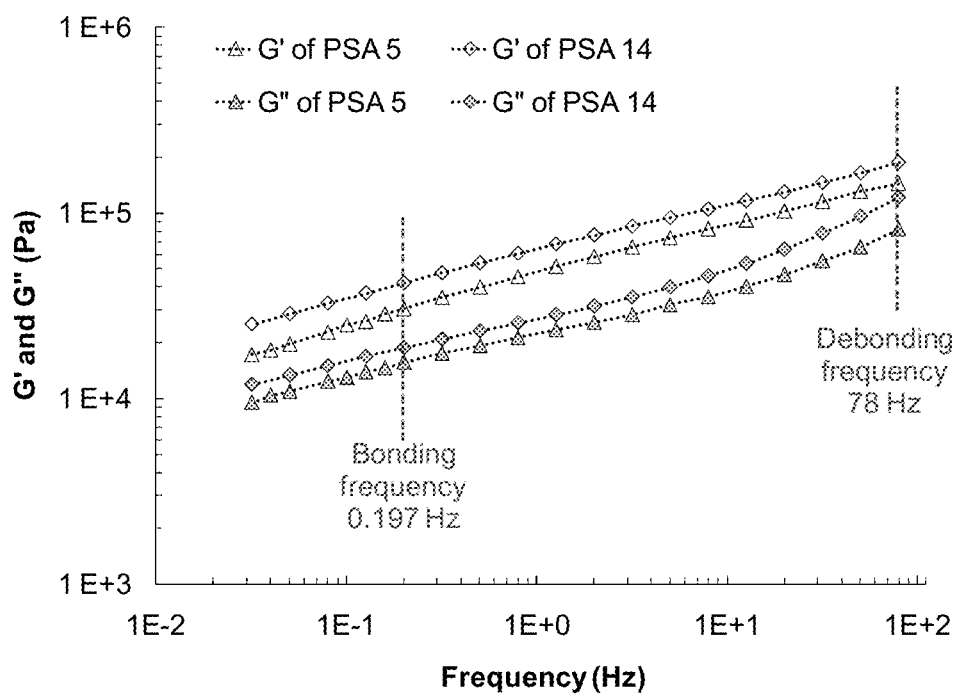
FIG. 18 is a graph showing the viscoelastic properties of PSAs 5 and 14 of Example 2. (Bonding and debonding frequency corresponds to PSA film thickness of 33 μm)

The PSA performance differences between PSAs 14 and 5 can be explained via their viscoelastic properties, shown in FIG. 18. The bonding ($\omega_2$) and debonding ($\omega_1$) frequencies were corrected according to equation (2) with a film thickness of 33 μm instead of 60 p.m. The $G''(\omega_2=78 \text{ Hz})$ for PSA 14 and 5 were 119292 and 80954 Pa, respectively, the $G'(\omega_1=0.179 \text{ Hz})$ for PSA 14 and 5 were 41214 and 29508, respectively, and the $G''(\omega_2)/G'(\omega_1)$ were 2.89 and 2.74, respectively. The slightly higher $G''(\omega_2)/G'(\omega_1)$ for PSA 14 was due to its lower gel content. The tack and peel strength increases of PSA 14 compared to PSA 5 were attributed mainly to the improved surface properties of PSA 14 due to the reduction in emulsifier concentration and the addition of AA and HEMA. The increase in shear strength is consistent with the formation of hydrogen bonds in PSA 14, which resulted higher modulus as shown in FIG. 18.

4 CONCLUSIONS

In a study of BA/MMA based PSAs, it was found that it was not possible to greatly improve peel strength even at the great sacrifice of shear strength either by using less cross-linker, by shortening monomer feed time, or by changing the BA/MMA monomer ratio from 90/10 to 95/5 to 98/2. This was confirmed with similar $G''(\omega_1)/G'(\omega_2)$ ratios when the BA content was increased, and the similar $G''(\omega_1)/G'(\omega_2)$ values were likely due to the similar polymer microstructures of the PSAs including gel content, $M_w$ and possibly $M_c$, as well as the narrow changes in $T_g$s.

Adding HEMA to the BA/MMA polymer appeared to be an interesting option. We found that for high gel content BA/MMA/HEMA PSAs, increases in HEMA content increased tack and peel strength as well as shear strength, for most cases. The reasons might be: (1) The $G''(\omega_1)/G'(\omega_2)$ ratios did not decrease much with the increase in HEMA. This was due to the somewhat densely packed state of the PSA polymer chains at both bonding and debonding frequencies caused by the presence of high amounts of gel. (2) At the same time, the work of adhesion between the PSAs and the testing panels was increased by adding HEMA. This work of adhesion increase was due to the presence of polar hydroxyl and carboxyl groups, which formed via oxidation of the primary hydroxyl groups of HEMA by the initiator. Furthermore, adding HEMA might also have decreased the amount of emulsifier on the PSA surface, due to the higher viscosity, and therefore, the work of adhesion could also have been increased. For low gel content BA/MMA/HEMA PSAs, the peel strength was not significantly affected by the change in the amount of HEMA. The reason was that with the increase of HEMA, the $G''(\omega_1)/G'(\omega_2)$ ratio greatly decreased as the PSA polymer chains were much more loosely packed at the bonding frequency than at the debonding frequency. Therefore, at the bonding frequency, the influence of HEMA on polymer chain packing and correspondingly modulus is more significant than at higher frequencies. As a result, the negative influence of the $G''(\omega_1)/G'(\omega_2)$ ratio on peel strength could no longer be counterbalanced by the positive influence caused by an increase in the work of adhesion.

Improvements to the PSA's surface properties through the addition of AA and HEMA (and greatly decreasing the emulsifier concentration) resulted in a PSA with improved cohesive strength, tack and peel strength. This was even accomplished using a much lower film thickness (33 vs. 60 μm).

In summary, it is possible to simultaneously increase tack, peel strength and shear strength for high gel content PSAs, which are very important commercially. This may be done by improving the PSA surface properties and increasing the PSA cohesion strength simultaneously. For example, monomers with polar groups such a hydroxyl and similar or even higher $T_g$ (compared to that of the copolymer before adding the polar monomer) in the monomer mixture, and also decrease the amount of emulsifiers.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

REFERENCES

1. Tobing S D, Klein A. "Molecular parameters and their relation to the adhesive performance of acrylic pressure-sensitive adhesives" J. Appl. Polym. Sci. (2001) 79(12): 2230-44.

2. Qie L, Dube M A. Europ. Polym. J. 2010, 46(6):1225-1236; Qie L., Dubé M. A., Macromolecular Reaction Engineering 2011, 5, 117-128.

3. Tse M F. J. Adhes. Sci. Technol. 1989, 3(7): 551-570.

EQUIVALENTS

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms 'comprising,' 'including,' 'containing,' etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase 'consisting essentially of' will be understood to include those elements specifically recited and those additional elements that do not materially affect the basic and novel characteristics of the claimed technology. The phrase 'consisting of' excludes any element not specified.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent compositions, apparatuses, and methods within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as 'up to,' 'at least,' 'greater than,' 'less than,' and the like, include the number recited and refer to ranges which can be subsequently broken down into subranges as discussed above. Similarly, the phrase "at least about" some value such as, e.g., wt % includes at least the value and about the value. For example "at least about 1 wt %" means "at least 1 wt % or about 1 wt %." Finally, as will be understood by one skilled in the art, a range includes each individual member.

Other embodiments are set forth in the following claims.

What is claimed is:

1. A latex comprising:
 a mixture of microgels and sol polymers of an acrylic copolymer, wherein
 the $M_c$ of the acrylic copolymer is greater than or equal to the $M_e$ thereof;
 the $M_w$ of the sol polymers is greater than or equal to twice the $M_e$ of the acrylic copolymer;
 the amount of sol polymer having a $M_w$ less than twice the $M_e$ of the acrylic copolymer is about 20 wt % or less than 20 wt %;
 wherein the acrylic copolymer comprises copolymerized monomers of
 a low $T_g$ acrylic monomer,
 a high $T_g$ monomer, and
 a hydroxyl-containing acrylic monomer; and
 wherein the acrylic copolymer further comprises a cross-linker wherein the cross-linker is a copolymerized acrylic monomer containing a second carbon-carbon double bond.

2. The latex of claim 1 wherein the acrylic copolymer comprises about 90 wt % to about 98 wt % of copolymerized low $T_g$ acrylic monomer.

3. The latex of claim 1 wherein the low Tg acrylic monomer is selected from the group consisting of butyl acrylate, 2-ethylhexyl acrylate, methyl acrylate, octyl acrylate, sec-butyl acrylate, dodecyl methacrylate, 2-ethoxyethyl acrylate, isobutyl acrylate, 2-methoxyethyl acrylate, octyl methacrylate and any two or more thereof.

4. The latex of claim 1 wherein the acrylic copolymer comprises about 1 wt % to about 9 wt % of copolymerized high $T_g$ monomer.

5. The latex of claim 1 wherein the high $T_g$ monomer is selected from the group consisting of methyl methacrylate, ethyl methacrylate, phenyl methacrylate, isobornyl methacrylate, methacrylic acid, acrylic acid, cyclohexyl methacrylate, isobornyl acrylate, isopropyl methacrylate, styrene, vinyl acetate, and any two or more thereof.

6. The latex of claim 1 wherein the acrylic copolymer comprises about 1 wt % to about 9 wt % of copolymerized hydroxyl-containing acrylic monomer.

7. The latex of claim 1 wherein the hydroxyl-containing acrylic monomer is selected from the group consisting of 2-hydroxyethyl methacrylate, 2-hydroxyethyl acrylate, 3-hydroxypropyl methacrylate, 3-hydroxypropyl acrylate and any two or more thereof.

8. The latex of claim 1 wherein the cross-linker is selected from the group consisting of allyl methacrylate, allyl acrylate, ethylene glycol diacrylate, butanediol acrylate, 1,6-hexanediol diacrylate, and any two or more thereof.

9. The latex of claim 1 comprising a surfactant.

10. The latex of claim 9 wherein the surfactant is selected from the group consisting of sodium dodecyl sulfate, sodium dodecyl benzene sulfate and combinations thereof.

11. The latex of claim 1 which is gel-free.

12. The latex of claim 1 having a gel content of at least about 20 wt %.

13. The latex of claim 1 having a gel content of at least about 60 wt %.

14. The latex of claim 1 wherein the amount of the sol polymers having a $M_w$ greater than twenty times the $M_e$ of the acrylic copolymer is about 20 wt % or less than 20 wt %.

15. The latex of claim 1 wherein the latex is an adhesive.

16. A method of manufacturing a latex comprising:
 polymerizing a monomer emulsion comprising water, a low $T_g$ acrylic monomer, a high $T_g$ monomer, a hydroxyl-containing acrylic monomer, and a cross-linker which is a copolymerized acrylic monomer containing a second carbon-carbon double bond, to provide a latex comprising a mixture of microgels and sol polymers of an acrylic copolymer; and
wherein
 the $M_c$ of the acrylic copolymer is greater than or equal to the $M_e$ thereof;
 the $M_w$ of the sol polymers is greater than or equal to twice the $M_e$ of the acrylic copolymer;
 the amount of sol polymer having a $M_w$ less than twice the $M_e$ of the acrylic copolymer is about 20 wt % or less than 20 wt %.

17. A film formed from a latex comprising:
 a mixture of microgels and sol polymers of an acrylic copolymer, wherein
 the $M_c$ of the acrylic copolymer is greater than or equal to the $M_e$ thereof;
 the $M_w$ of the sol polymers is greater than or equal to twice the $M_e$ of the acrylic copolymer;
 the amount of sol polymer having a $M_w$ less than twice the $M_e$ of the acrylic copolymer is about 20 wt % or less than 20 wt %;
 wherein the acrylic copolymer comprises copolymerized monomers of
 a low $T_g$ acrylic monomer,
 a high $T_g$ monomer, and
 a hydroxyl-containing acrylic monomer; and
 wherein the acrylic copolymer further comprises a cross-linker wherein the cross-linker is copolymerized acrylic monomer containing a second carbon-carbon double bond.

18. A method of manufacturing a film comprising casting a latex into a film and drying the film wherein the latex comprises:
 a mixture of microgels and sol polymers of an acrylic copolymer, wherein
 the $M_c$ of the acrylic copolymer is greater than or equal to the $M_e$ thereof;
 the $M_w$ of the sol polymers is greater than or equal to twice the $M_e$ of the acrylic copolymer;
 the amount of sol polymer having a $M_w$ less than twice the $M_e$ of the acrylic copolymer is about 20 wt % or less than 20 wt %;
 wherein the acrylic copolymer comprises copolymerized monomers of
 a low $T_g$ acrylic monomer,
 a high $T_g$ monomer, and
 a hydroxyl-containing acrylic monomer; and
 wherein the acrylic copolymer further comprises a cross-linker wherein the cross-linker is a copolymerized acrylic monomer containing a second carbon-carbon bond.

* * * * *

UNITED STATES PATENT AND TRADEMARK OFFICE
CERTIFICATE OF CORRECTION

PATENT NO. : 8,507,605 B2
APPLICATION NO. : 13/033547
DATED : August 13, 2013
INVENTOR(S) : Dube et al.

Page 1 of 3

It is certified that error appears in the above-identified patent and that said Letters Patent is hereby corrected as shown below:

On Title Page 2, item (56), under "OTHER PUBLICATIONS", in Column 2, Line 43, delete "fibrilation" and insert -- fibrillation --, therefor.

In the Specifications:

In Column 2, Line 36, delete "μm)" and insert -- μm). --, therefor.

In Column 2, Line 48, delete "μm)" and insert -- μm). --, therefor.

In Column 2, Line 51, delete "μm)" and insert -- μm). --, therefor.

In Column 2, Line 55, delete "μm)" and insert -- μm). --, therefor.

In Column 2, Line 59, delete "μm)" and insert -- μm). --, therefor.

In Column 2, Line 62, delete "μm)" and insert -- μm). --, therefor.

In Column 4, Line 60, delete "thioamido," and insert -- thioamide, --, therefor.

In Column 5, Line 15, delete "2-chlorophenyloxy." and insert -- 2-chlorophenoxy. --, therefor.

In Column 5, Line 44, delete "$M_y$," and insert -- $M_w$ --, therefor.

In Column 5, Line 62, delete "Tg" and insert -- $T_g$ --, therefor.

In Column 8, Line 26, delete "NanoS" and insert -- Nano --, therefor.

In Column 8, Line 59, delete "β," and insert -- α, --, therefor.

Signed and Sealed this
Sixth Day of May, 2014

Michelle K. Lee
*Deputy Director of the United States Patent and Trademark Office*

CERTIFICATE OF CORRECTION (continued)
U.S. Pat. No. 8,507,605 B2

In Column 9, Line 1, delete "Mc was" and insert -- $M_c$ was --, therefor.

In Column 9, Line 1, delete "Mc," and insert -- $M_c$, --, therefor.

In Column 9, Line 6, delete "Mc," and insert -- $M_c$, --, therefor.

In Column 9, Line 8, delete " $M_c=\{V_1\rho_P[\phi^{1/2}-/2]\}/\{-[\ln(1-\phi)+\phi+\chi\phi^2]\}$ " and insert -- $M_c=\{V_1\rho_p[\varphi^{1/2}-\varphi/2]\}/\{-[ln(1-\varphi)+\varphi+\chi\varphi^2]\}$ --, therefor.

In Column 9, Line 34, delete "(11)".

In Column 11, Line 63, delete "rate.]" and insert -- rate. --, therefor.

In Column 12, Line 15, delete "$M_e$." and insert -- $M_c$. --, therefor.

In Column 12, Line 22, delete "$M_y$," and insert -- $M_w$ --, therefor.

In Column 12, Line 27, delete "(i.e," and insert -- (i.e., --, therefor.

In Column 12, Line 50, delete "ma'," and insert -- $mol^{-1}$, --, therefor.

In Column 16, Line 18, delete "(-10" and insert -- (~10 --, therefor.

In Column 16, Line 64, delete "M," and insert -- $M_w$, --, therefor.

In Column 17, Line 36, delete "$M_e$" and insert -- $M_c$ --, therefor.

In Column 18, Line 22, delete "$M_e$" and insert -- $M_c$ --, therefor.

In Column 18, Line 27, delete "$M_w$" and insert -- $M_w$: --, therefor.

In Column 18, Line 33, delete "(0.002 Hz)." and insert -- (~0.002 Hz). --, therefor.

In Column 19, Line 1, delete "(0.002 Hz)" and insert -- (~0.002 Hz) --, therefor.

In Column 19, Line 20, delete "$M_e$" and insert -- $M_c$ --, therefor.

In Column 19, Line 22, delete "M." and insert -- $M_w$. --, therefor.

In Column 19, Line 27, delete "M," and insert -- $M_w$, --, therefor.

In Column 20, Line 20, delete "cross-linker;" and insert -- cross-linker, --, therefor.

CERTIFICATE OF CORRECTION (continued)
U.S. Pat. No. 8,507,605 B2

In Column 20, Line 46, delete "(-150 nm)." and insert -- (~150 nm). --, therefor.

In Column 23, Line 26, delete "($\phi_1$)" and insert -- ($\omega_1$) --, therefor.

In Column 23, Line 61, delete "$T_g$," and insert -- $T_g$ --, therefor.

In Column 30, Line 42, delete "PSA5)." and insert -- PSA 5). --, therefor.

In Column 30, Line 51, delete "60 p.m." and insert -- 60 μm. --, therefor.

In the Claims:

In Column 33, Line 30, in Claim 3, delete "Tg" and insert -- $T_g$ --, therefor.

In Column 34, Lines 61-62, in Claim 18, delete "carbon-carbon bond." and insert -- carbon-carbon double bond. --, therefor.